(12) United States Patent
Acorda et al.

(10) Patent No.: US 11,644,949 B2
(45) Date of Patent: May 9, 2023

(54) AUTOTAGGING A TEMPLATE OF A REPORTING WORKBOOK

(71) Applicant: Oracle International Corporation, Redwood Shores, CA (US)

(72) Inventors: Victor Acorda, Wallingford, CT (US); Yan Schwartz, Livingston, NJ (US); Andrew Harris, Lake Stevens, WA (US); John Purves, Exton, PA (US)

(73) Assignee: Oracle International Corporation, Redwood Shores, CA (US)

( * ) Notice: Subject to any disclaimer, the term of this patent is extended or adjusted under 35 U.S.C. 154(b) by 475 days.

(21) Appl. No.: 15/462,401

(22) Filed: Mar. 17, 2017

(65) Prior Publication Data
US 2017/0371847 A1 Dec. 28, 2017

Related U.S. Application Data

(60) Provisional application No. 62/355,015, filed on Jun. 27, 2016.

(51) Int. Cl.
| | | |
|---|---|---|
| *G06F 3/0482* | (2013.01) | |
| *G06F 40/117* | (2020.01) | |
| *G06F 40/18* | (2020.01) | |
| *G06F 40/154* | (2020.01) | |
| *G06F 40/186* | (2020.01) | |
| *G06F 40/143* | (2020.01) | |

(52) U.S. Cl.
CPC .......... *G06F 3/0482* (2013.01); *G06F 40/117* (2020.01); *G06F 40/143* (2020.01); *G06F 40/154* (2020.01); *G06F 40/18* (2020.01); *G06F 40/186* (2020.01)

(58) Field of Classification Search
CPC ...... G06F 17/218; G06F 17/28; G06F 40/117; G06F 40/186; G06F 40/18; G06F 40/154; G06F 40/14; G06F 3/0482
USPC ......................................... 715/212
See application file for complete search history.

(56) References Cited

U.S. PATENT DOCUMENTS

| | | | |
|---|---|---|---|
| 7,836,394 B2 * | 11/2010 | Linder .................. | G06Q 40/00 715/234 |
| 8,346,811 B2 * | 1/2013 | Wyatt .................. | G06F 16/283 707/793 |
| 2006/0015805 A1 * | 1/2006 | Humenansky ..... | G06Q 10/0631 715/209 |

(Continued)

OTHER PUBLICATIONS

Video Guide for BinFinx Preparation Tool (Part 3)—Auto-tag'; https://www.youtube.com/watch?v:Q_ZSAUgvnkw.

*Primary Examiner* — Kavita Stanley
*Assistant Examiner* — Tionna M Burke
(74) *Attorney, Agent, or Firm* — Trellis IP Law Group, PC

(57) ABSTRACT

Autotagging a template of a reporting workbook is provided. The template of the reporting workbook is received. The template is in a first format type. User specified selection of portions of the template are received. The portions are associated with at least two dimensions of the reporting workbook. A user specified type is received for a tag. A modification of the template is created by automatically generating a tag in a predetermined field of each of the portions based on the user specified type. A version of the reporting workbook is generated based on the modification of the template, wherein the version is in a second format type.

20 Claims, 26 Drawing Sheets

(56) References Cited

U.S. PATENT DOCUMENTS

| | | | |
|---|---|---|---|
| 2006/0107196 A1* | 5/2006 | Thanu | G06F 40/18 |
| | | | 715/217 |
| 2009/0006472 A1* | 1/2009 | Bush | G06F 17/2247 |
| 2013/0073937 A1* | 3/2013 | Fernandes | G06Q 10/067 |
| | | | 715/212 |
| 2013/0132812 A1* | 5/2013 | Goel | G06F 40/18 |
| | | | 715/220 |
| 2016/0092728 A1* | 3/2016 | Tsutsui | G06F 40/171 |
| | | | 715/268 |

* cited by examiner

FIGURE 3

TABLEBEGIN

UNT($cop),#CON, CTX($ctxAcumulodo Anterior)

DATA

| # | Description | 42000 | 800100 | 800200 | 800300 | 800400 | 800500 | 800600 | 811000 | 815000 |
|---|---|---|---|---|---|---|---|---|---|---|
| 1 | [800180] Notas-Subclasificaciones de activos, pasivos y patrimonio | | | | | | | | | |
| 2 | Subclasificaciones de activos, pasivos y patrimonio [sinopsis] | | | | | | | | | |
| 3 | Efectivo y equivalentes al efectivo [sinopsis] | | | | | | | | | |
| 4 | Efectivo [sinopsis] | | | | | | | | | |
| 5 | Efectivo en caja | | | | | | | | | |
| 6 | Saldos en bancos | | | | | | | | | |
| 7 | Total efectivo | | | | | | | | | |
| 8 | Equivalentes al efectivo [sinopsis] | | | | | | | | | |
| 9 | Depósitos a corto plazo, clasificados como equivalentes al efectivo | | | | | | | | | |
| 10 | Inversiones a corto plazo, clasificados como equivalentes al efectivo | | | | | | | | | |
| 11 | Otros acuerdos bancarios, clasificados como equivalentes al efectivo | | | | | | | | | |
| 12 | Total equivalentes al efectivo | 100 | | | | | | | | |
| 13 | Otro efectivo y equivalentes al efectivo | | | | | | | | | |
| 14 | Total de efectivo y equivalentes al efectivo | 124 | | | | | | | | |
| 15 | Propiedades, planta y equipo [sinopsis] | | | | | | | | | |
| 16 | Terrenos y construcciones [sinopsis] | | | | | | | | | |
| 17 | Terrenos | | | | | | | | | |
| 18 | Edificios | | | | | | | | | |
| 19 | Total terrenos y edificios | 35 | | | | | | | | |
| 20 | Maquinaria Y Equipo [sinopsis] | | | | | | | | | |
| 21 | Maquinaria y Equipo en Producción | 21 | | | | | | | | |
| 22 | Maquinaria y Equipo en Montaje | 22 | | | | | | | | |
| 23 | Total de Maquinaria y Equipo | 43 | | | | | | | | |
| 24 | Vehículos [sinopsis] | | | | | | | | | |
| 25 | Buses | | | | | | | | | |
| 26 | Aeronave | | | | | | | | | |
| 27 | Equipo de Transporte | | | | | | | | | |
| 28 | Total vehículos | 78 | | | | | | | | |
| 29 | Muebles Enseres y accesorios | | | | | | | | | |
| 30 | Equipo de oficina | 30 | | | | | | | | |
| 31 | Equipo de Computo | 31 | | | | | | | | |
| 32 | Acueducto, Plantas y Redes | 32 | | | | | | | | |
| 33 | Armamento de Vigilancia | 33 | | | | | | | | |
| | DEI index | 42000 | 800100 | 800200 | 800300 | 800400 | 800500 | 800600 | 811000 | 815000 |

Coil A2 commented by Yan Schwartz

Figure 4A:
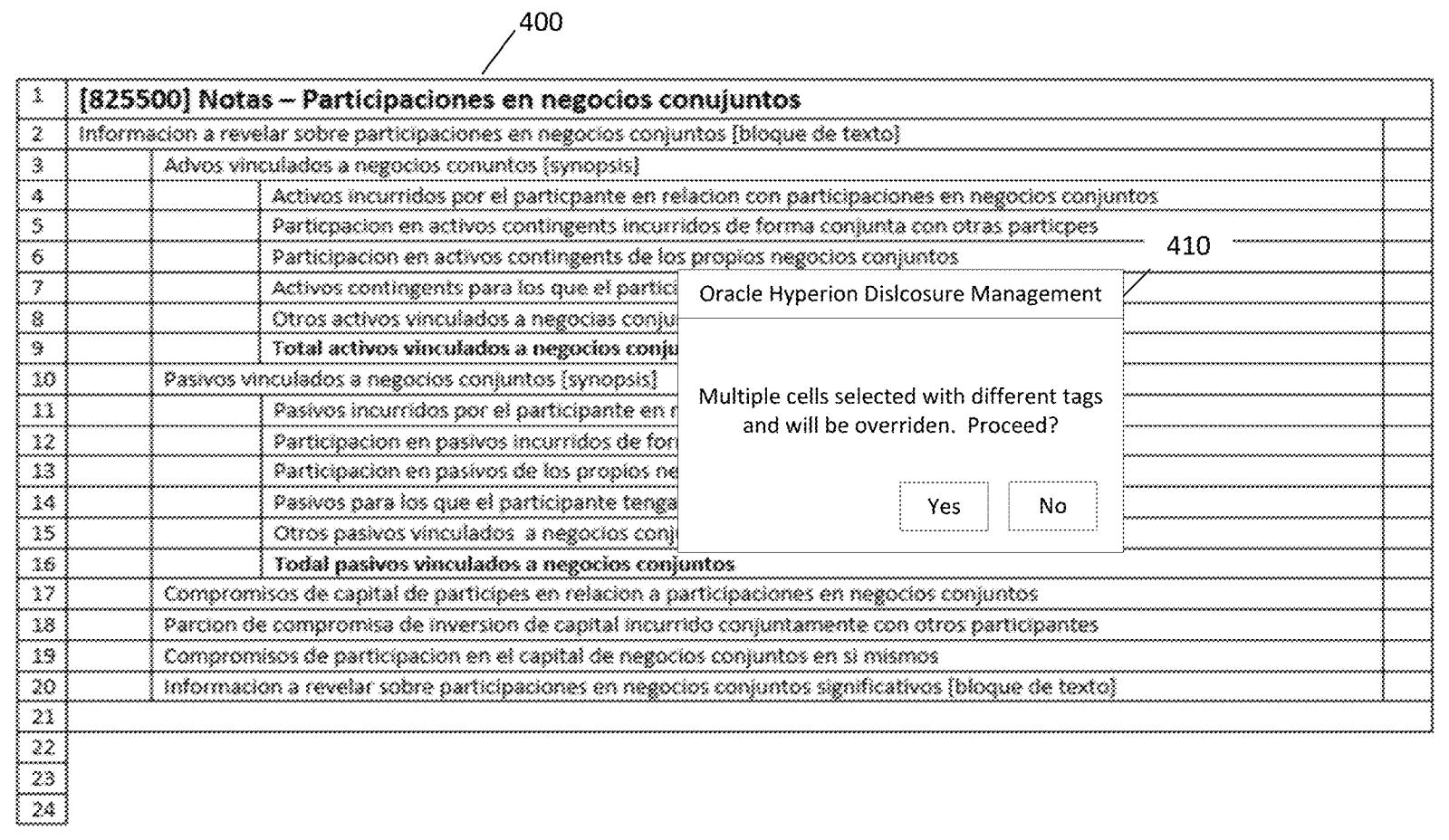

[825500] Notas – Participaciones en negocios conjuntos

Oracle Hyperion Disclosure Management

Multiple cells selected with different tags and will be overriden. Proceed?

Yes    No

FIGURE 7

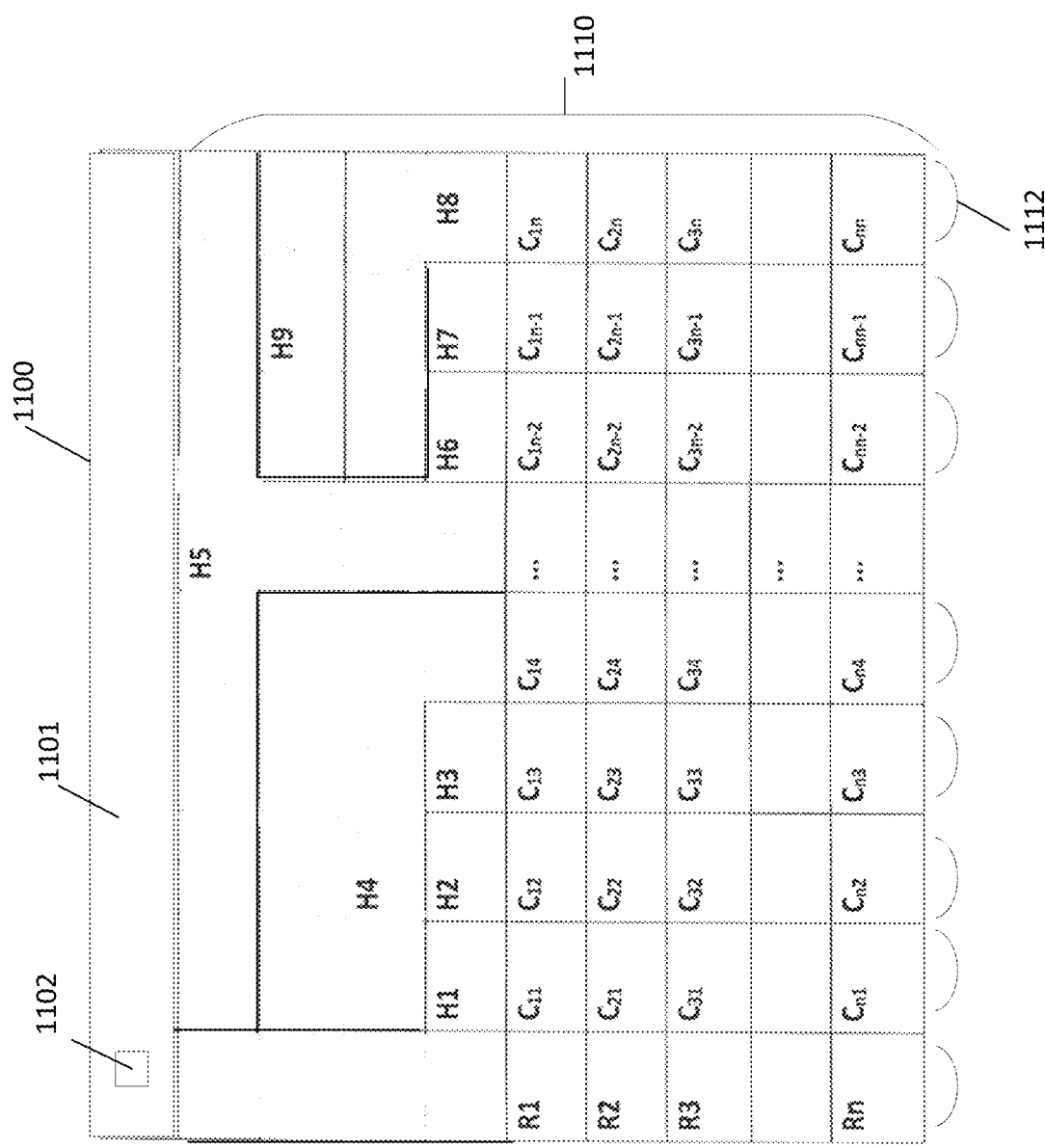

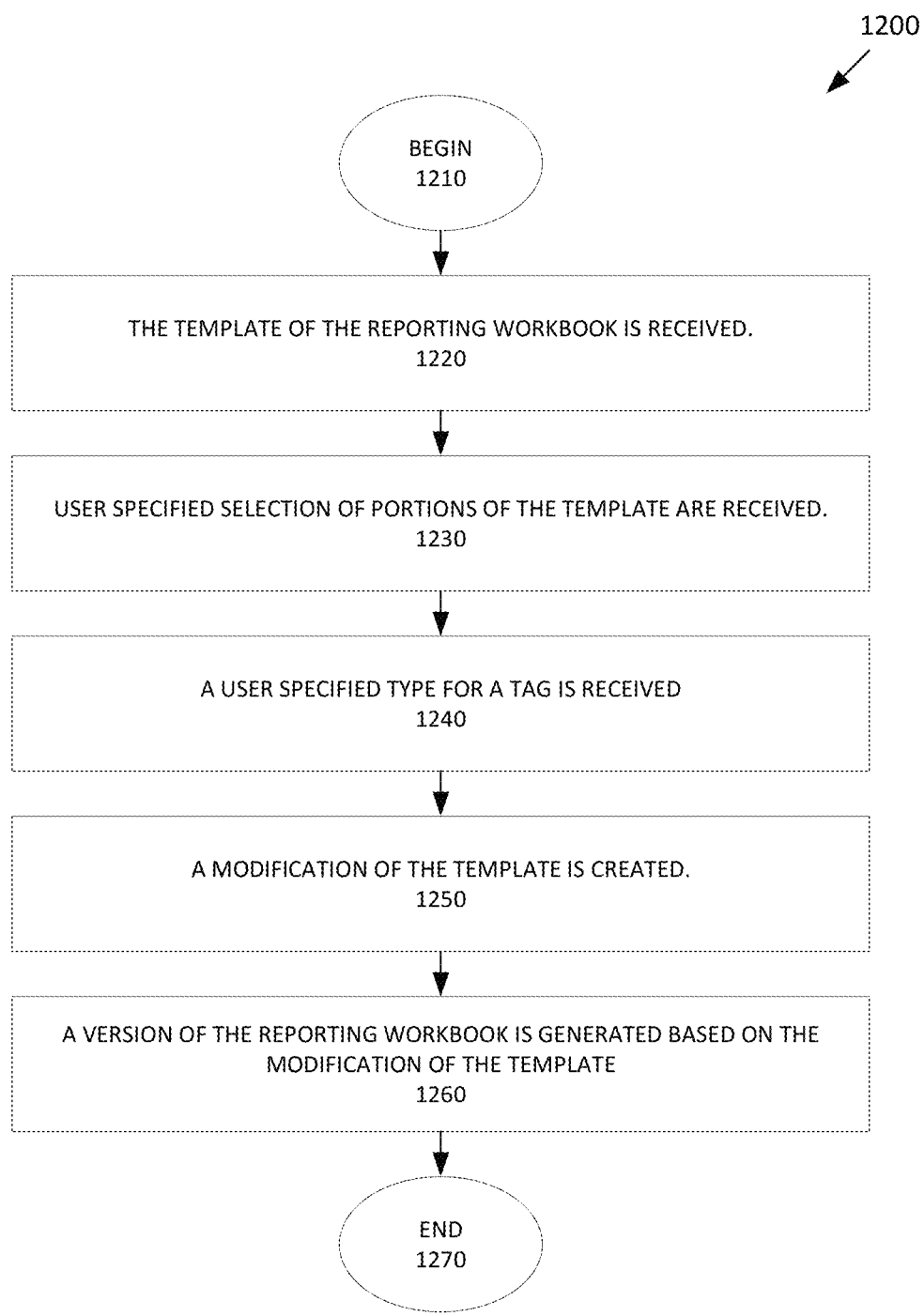

FIGURE 13

| | A | B | C | D |
|---|---|---|---|---|
| 1 | DEI_BEGIN; — 1311 | | | |
| 2 | taxonomy | two61= | "http://www.superfinanciera.gov.co/xbrl/) | |
| 3 | entity | ent= | "123456789" | |
| 4 | scheme | lei= | "http://www.superfinanciera.gov.co" | |
| 5 | ctx | ctxAcumuladoActual= | 2015-01-01-2015-06-30 (Sent, $ie) | |
| 6 | ctx | ctxAcumuladoAnterior= | 2014-01-01-2014-06-30 (Sent, $ie) | |
| 7 | ctx | ctx3= | 2015-01-01-2015-12-31 (Sent, $ie) | |
| 8 | ctx | ctx4= | 2015-01-01 (Sent, $ie) | |
| 9 | unit | cop= | "iso4217:COP" (decimals="6", scaling="6"L | |
| 10 | unit | shares= | "shares" (decimals="6", scaling="6") | |
| 11 | unit | usd_per_share= | "USD"/"shares" (decimals="6", scaling="6") | |
| 12 | DEI_END; — 1312 | | | |
| 13 | | | | |
| 14 | | | | |
| 15 | | | | |

FIGURE 14

| 1 | DEL_BEGIN; | | |
|---|---|---|---|
| 2 | taxonomy | bank_int_ind= | "http://www.superfinanciera.gov.co/xbrl/ifrs/2015-01-01/ec-1-vco-ind-int" |
| 3 | entity | ent= | "123456789" |
| 4 | scheme | lei= | "http://www.superfinanciera.gov.co" |
| 5 | ctx | ctxAcumuladoActual= | 2015-01-01-2015-06-30 (Sent, S)e) |
| 6 | ctx | ctxAcumuladoAnterior= | 2014-01-01-2014-06-30 (Sent, S)e) |
| 7 | ctx | ctxD3= | 2015-01-01-2015-12-31 (Sent, S)e) |
| 8 | ctx | ctxI4= | 2015-01-01(Sent, S)e) |
| 9 | unit | cop= | "iso4217:COP" (decimals="6", scaling=".6"L |

| | | | |
|---|---|---|---|
| 1 | DEI_BEGIN; | | |
| 2 | taxonomy | Bank_int_ind= | ; |
| 3 | entity | ent= | "http://www.superfinanciera.gov.co/xbrl/ifrs/2015-01-01/ec-14bcc-con-int" |
| 4 | scheme | lei= | "123456789" |
| 5 | ctx | ctxAcumuladoActual= | "http://www.superfinanciera.gov.co" |
| 6 | ctx | ctxAcumuladoAnterior= | 2015-01-01-2015-06-3(Sent, 1ei) |
| 7 | ctx | ctxD3= | 2014-01-01-2014-06-30 (Sent, $lei) |
| 8 | ctx | Ctxt4= | 2015-Q1 |
| 9 | unit | cop= | "iso4217" |
| 10 | unit | usd= | "iso" |
| 11 | unit | shares= | "shares" |
| 12 | unit | pure= | "pure" |
| 13 | unit | usd_per_share= | "iso4217" |
| 14 | DEI_END; | | |

Error: Encountered "ent" at line 5, column 52,
Was expecting:
"$"...
[OK]  —1601

| | | | |
|---|---|---|---|
| 4 | scheme | lei= | "http://www.superfinanciera.gov.co" |
| 5 | ctx | ctxAcumuladoActual= | 01/01/15-2015-06-30 (Sent, 1ei) |
| 6 | ctx | ctxAcumuladoAnterior= | 2014-01-01-2014-06-30 (Sent, $lei) |
| 7 | ctx | ctxD3= | 2015-01-01-2015-12-31 (Sent, $lei) |
| 8 | ctx | Ctxt4= | 2015-Q1-Q1(Sent, $lei) |
| 9 | unit | cop= | "iso4217:COP" (decimals="6", scaling="6")'L |
| 10 | unit | usd= | "iso" |
| 11 | unit | shares= | "shares" (i |
| 12 | unit | pure= | "pure" |
| 13 | unit | usd_per_share= | "iso4217:C |
| 14 | DEI_END; | | |

Error: Encountered "01" at line 5, column 26,
Was expecting:
<DATE>...
[OK]  —1602

FIGURE 18

```
/1801
<?xml version="1.0" encoding="utf-8"?>
                                                                                                      1800
<Report xmlns: xsi="http://www.w3.org/2001/XML.Schema-instance" xmlns:xsd="http://www.w3.org/2001/XMLSchema" name="822390-1" taxonomy="http://www
maxMessagesInValidationReport="1000" extractMappings="true" jurisdiction="other" assignDefaultValues="true" allowDefaultDimensionValues="false
"false" ignoreDefaultDimensionValueMaps="true">
   <Namespaces count="1">
      <Namespace prefix="ifrs2012" taxonomyPrefix="ifrs2012" namespaceUri="http://xbrl.ifrs.org/taxonomy/2012-03-29/ifrs" />
   </Namespaces>
   <Grid name ="822390-1" version="" dataSource="" type="" rowCount="60" colCount="21">
      <Cells count="453">
                                    1811
        <Cell value="1" flippedSign="false" row="1" col="13" pov="" cellText="" precision="0" decimals="0" scale="0" status="valid" issue="">
1810 ─┤ 1831 ──── PrimaryItemMap tableName="1" scheduleName="822390-=" scope="cell" type="Excel" cell="$M$=1">──1812      1813
      1841 ─── ConceptMap name ="${Eval(to-concept('i22390-=', 'Informacion a revelar de activos financieros [bloque de texto]' )}}" />
      1851 ─── ConceptMap schema="http://www.superfinanciers.gov.co" entity="123456789" startDate="201-01-01" endDate="2015-06-30" />
        </PrimaryItemMap>
      </Cell>
                                    1821
        <Cell value="901" flippedSign="false" row="9" col="6" pov="" cellText="" precision="0" decimals="0" scale="0" status="valid" issue="">
      1832 ──── PrimaryItemMap tableName="2" scheduleName="822390-=" scope="cell" type="Excel" cell="$F$=9">── 1822      1823
      1842 ──── ConceptMap name ="${Eval(to-concept('i22390-=', 'Saldo antes de cuentas correctoras' )}}" />
1820 ─┤1852 ──── ConceptMap schema="http://www.superfinanciers.gov.co" entity="123456789" startDate="201-01-01" endDate="2015-01-01" />
      1861 ──── UnitMap numerator="iso4217:COP" divideBy="false" decimals="0" scale="0" />
      1871 ──── <ExplicitDimensionMap dimensionName="${Eval(to-dimension('822390-1', 'Cartera de Consumo [miembro]' )}}" memberName="${Eval(to-dommain(
              "${Eval(to-member-value('822390-1', 'Cartera de Consumo [miembro]' )}} />
        </PrimaryItemMap>
                                                1872                              1873
      </Cell>
```

| Formulas | Presentation | Calculation | Dimension |

Presen
[210000] Estado de situacion financiera, corriente
ifrs:StatementOfFinancialPositionAbstract
  ifrs:Assets Abstract
    ifrs:CurrentAssetsAbstract
      ifrs:CashAndCashEquivalents
      co-sfc-core:InversionesCorrientes
      co-sfc-core:TradeAndOtherCurrentReceivables
      co-sfc-core:CuentasCobrarPartesR...
      ifrs:Inventories
      ifrs:CurrentTaxAssetsCurrent
      ifrs:CurrentBiologicalAssets
      co-sfc-core:RecursosHidrocarburosYMinerals...
      ifrs:OtherCurrentFinancialAssets
      ifrs:OtherCurrentNonFinancialAssets
      ifrs:CurrentAssetsOtherThanAssets...
      ifrs:CurrentAssets
      ifrs:NoncurrentAssetsAbstract

1902

| | A |
|---|---|
| 1 | [210000] Estado de situacion financiera, corriente/no corriente |
| 2 | Estado de situacion financi [sinopsis] |
| 3 | Activos [sinopsis] |
| 4 | Activos Corrientes [sinopsis] |
| 5 | Efectivo y equivalentes al efectivo |
| 6 | Inversiones corrientes |
| 7 | Cuentas comerciales por cobrar y otras cuentas por cobrar corrientes |
| 8 | Cuentas por cobrar partes relacionadas y asociadas corrientes |
| 9 | Inventarios corrientes |
| 10 | Activos por impuestos Corrientes, corriente |
| 11 | Activos biologicos corrientes |
| 12 | Recursos hidrocarburos y minerals corrientes |
| 13 | Otros activos financieros corrientes |
| 14 | Otros activos no financieros corrientes |
| 15 | Total activos Corrientes distintos de los activos no Corrientes o grupo de activos para su disposicion clasificados como mantenidos para la venta o como mantenidos para distribuir a los propietarios |
| 16 | Activos no Corrientes o grupos de activos para su disposicion clasificados como mantenidos para la venta o como mantenidos para distribuir a los propietarios |
| 17 | Activos Corrientes totales |

Indice | 105000 | 11000 | 210000 | 310000 | 410000 | 510000 | 610000 | 813000 | 813100

Ready

FIGURE 22

| A 2231 | B 2232 | C 2233 | D 2234 |
|---|---|---|---|
| | Dimension Parent ("J Shape") 2210 | | Dimension With No Child 2220 |
| | HANDLE 2241 | HEAD 2242 | |
| Dimension Child 1 2211 | 2251  100 | 2255  300 | 2257  400 |
| | 2252  500 | 2256  700 | 2258  800 |
| Dimension Child 2 2212 | 2253  200 | | |
| | 2254  600 | | |

FIGURE 23

| F | G | H | I | J | K | L | |
|---|---|---|---|---|---|---|---|
| \multicolumn{7}{c}{Capital emitido [miembro] 2360} | 2370 |
| \multicolumn{7}{c}{Señalado actualmente [miembro]  HANDLE 2341} | 2310 |
| Presentado Anteriormente [miembro] | Incremento (disminucion) debido a cambios en políticas contables y correciones de errores de periodos anteriores [miembro] | | | | | HEAD 2342 | |
| | Incremento (disminucion) debido a cambios en Políticas contables [miembro] | | | Incremento (disminucion) debido a correciones de errores de periodos anteriores [miembro] | | | |
| | Incremento (disminucion) debido a cambios en políticas contables requeridas por las NIF | Incremento (disminucion) debido a cambios voluntaries en políticas contables [miembro] | | | | | |
| 1201 | 1202 | 1203 | 1204 | 1205 | 1206 | 1207 | 2321 |
| 1501 | 1502 | 1503 | 1504 | 1505 | 1506 | 1507 | 2322 |
| 1606 | 1607 | 1608 | 1609 | 1610 | 1611 | 1612 | 2323 |
| 1711 | 1712 | 1713 | 1714 | 1715 | 1716 | 1717 | 2324 |
| 1816 | 1817 | 1818 | 1819 | 1820 | 1821 | 1822 | 2325 |
| 1921 | 1922 | 1923 | 1924 | 1925 | 1926 | 1927 | 2326 |
| 2026 | 2027 | 2028 | 2029 | 2030 | 2031 | 2032 | 2327 |
| 2131 | 2132 | 2133 | 2134 | 2135 | 2136 | 2137 | . |
| 2236 | 2237 | 2238 | 2239 | 2240 | 2241 | 2242 | . |
| 2341 | 2342 | 2343 | 2344 | 2345 | 2346 | 2347 | . |
| 2446 | 2447 | 2448 | 2449 | 2450 | 2451 | 2452 | 232n |

```
<Cell value="1207" flippedSign="false" row="12" col="12" pov="" cellText=""
precision="0" decimals="0" scale="0" status="valid" issue="">
    <PrimaryItemMap scheduleName="610000" scope="cell" type="Excel" cell="$L$12">
        <ConceptMap name="${Eval(to-concept('610000', 'Patrimonio al inicio del
periodo'))}" />
        <ContextMap scheme="www.superfinanciera.gov.co"
entity="260_con_int_20160505" startDate="2015-01-01" endDate="2015-12-31" />
        <UnitMap numerator="iso4217:COP" divideBy="false" decimals="-6" scale="6" />
        <ExplicitDimensionMap dimensionName="${Eval(to-dimension('610000', 'Capital
emitido [miembro]'))}" memberName="${Eval(to-domain('610000', 'Capital emitido
[miembro]'))}" memberValue="${Eval(to-member-value('610000', 'Capital emitido
[miembro]'))}" />
        <ExplicitDimensionMap dimensionName="${Eval(to-dimension('610000', 'Señalado
actualmente [miembro]'))}" memberName="${Eval(to-domain('610000', 'Señalado
actualmente [miembro]'))}" memberValue="${Eval(to-member-value('610000', 'Señalado
actualmente [miembro]'))}" />
    </PrimaryItemMap>
</Cell>
```

AUTOTAGGING A TEMPLATE OF A REPORTING WORKBOOK

CROSS REFERENCES TO RELATED APPLICATIONS

This application claims priority from U.S. Provisional Patent Application Ser. No. 62/355,015, entitled XBRL AUTO TAGGING, filed on Jun. 27, 2016, which is hereby incorporated by reference as if set forth in full in this application for all purposes.

BACKGROUND

Extensible Markup Language (XML) is a markup language that has rules for encoding documents in a format that is both human-readable and machine-readable. XML provides simplicity, generality, and usability across the Internet. It is a textual data format that provides support for various human languages. XML is widely used for the representation of arbitrary data structures, such as data structures used in web services.

Extensible Business Reporting Language (XBRL) is a type of XML. The use of eXtensible Business Reporting Language (XBRL) as a global standard of financial reporting has been adopted by approximately 100 regulatory bodies worldwide. This adoption has improved the transparency and accuracy of financial reporting but has also given rise to multiple requirements that financial reporting systems must provide. Due to the complexity and voluminous nature of some reporting, certain systems fall short on being able to produce the reports in a timely nature. In fact, some regulators require reporting fact values in excess of 20,000 individual tags. A standard reporting scenario requires the company to manually apply an XBRL tag to each fact value, where each fact value is represented as a cell in an Excel worksheet. Due to these higher volumes, it can take a company many weeks to fully prepare their report for XBRL generation. In some cases, the system may time out or crash trying to generate an XBRL version of the workbook that could be submitted to the Regulator.

SUMMARY

Various embodiments provide for creating a target version of a business reporting workbook (also referred to as a "template") that is not in a desired format.

In one embodiment, autotagging a template of a reporting workbook is provided. The template of the reporting workbook is received. The template is in a first format type. User specified selection of portions of the template are received. The portions are associated with at least two dimensions of the reporting workbook. A user specified type is received for a tag. A modification of the template is created by automatically generating a tag in a predetermined field of each of the portions based on the user specified type. A version of the reporting workbook is generated based on the modification of the template, wherein the version is in a second format type.

A further understanding of the nature and the advantages of particular embodiments disclosed herein may be realized by reference of the remaining portions of the specification and the attached drawings.

BRIEF DESCRIPTION OF THE DRAWINGS

FIG. 3 depicts a screen shot after cells have been selected and tagged on a worksheet, according to one embodiment.

FIG. 4A depicts a screen shot with a warning message indicating that the user selected more than one cell that have different types of tags, according to one embodiment.

FIGS. 7 and 8 depict respective screen shots for tagging the beginning of a table, according to various embodiments.

FIG. 11 depicts a portion of a sheet of workbook, according to one embodiment.

FIG. 12 depicts a flowchart of a method of autotagging a template of a reporting workbook, according to one embodiment.

FIG. 13 depicts an example of a document entity information (DEI) sheet, according to one embodiment.

FIG. 14 depicts some examples of defined contexts, according to one embodiment.

Figure 15:
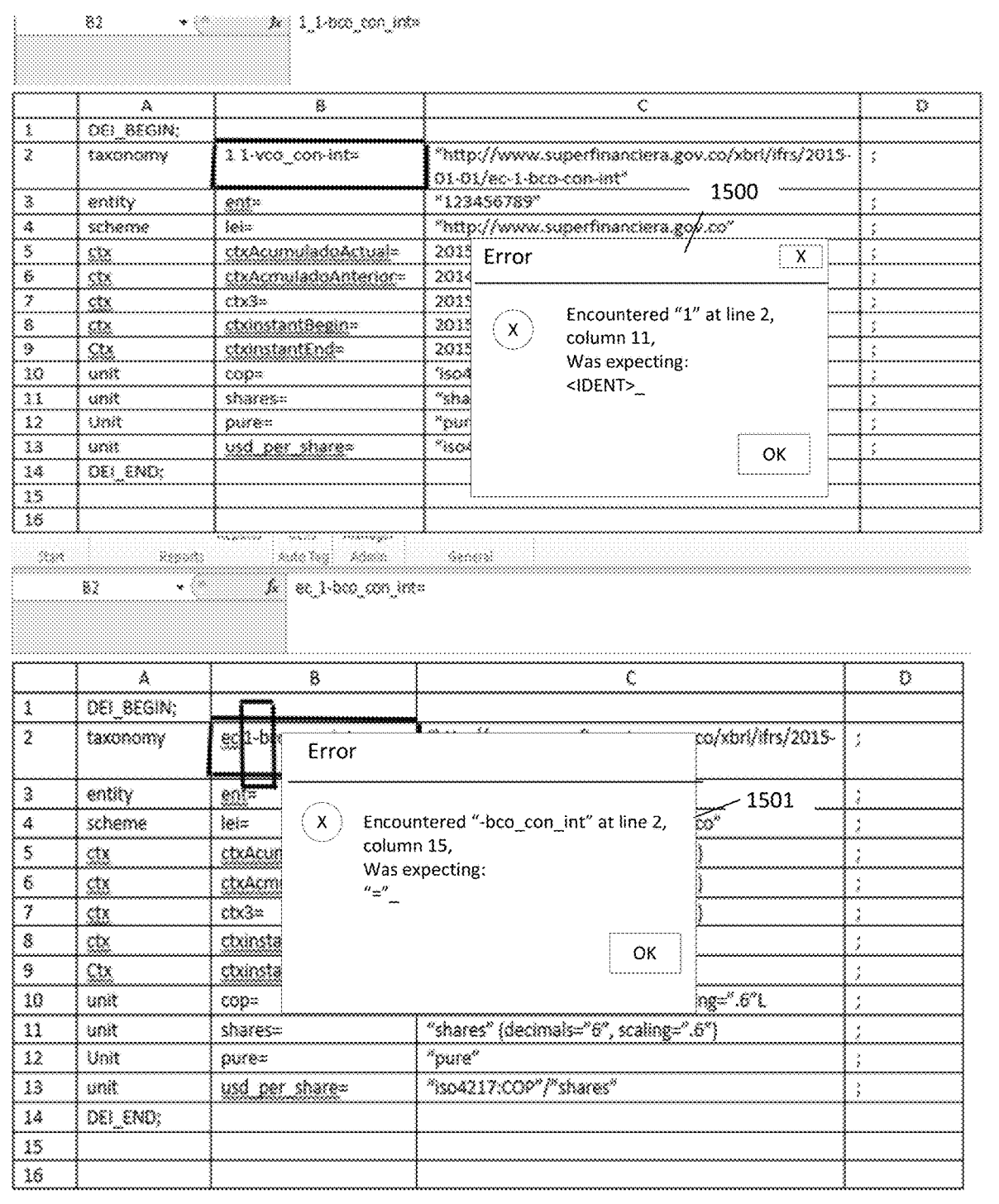

FIGS. 15 and 16 depict error messages, according to various embodiments.

FIG. 18 depicts a portion of an intermediate mapping file, according to one embodiment.

FIG. 19 depicts corresponding portions of a workbook and a taxonomy for the same network, according to one embodiment.

FIG. 22 depicts a screen shot of a user interface with a J shape, according to one embodiment.

FIG. 23 depicts a screen shot of a user interface with a J shape, according to one embodiment.

FIG. 24 depicts a cell definition of an intermediate mapping file that includes an explicit dimension map, according to one embodiment.

DETAILED DESCRIPTION OF EMBODIMENTS

Although features of the embodiments are described with respect to XBRL or other forms of XML it is possible that other types of markup language or even other types of descriptions can be used with different embodiments. Other particular features, formats or characteristics used in the descriptions of the example embodiments may be changed.

Various embodiments are illustrated with a template that is in Excel®. However, in other embodiments, the template workbook may be or may use another type of document, such as Microsoft Word®, PowerPoint®, Adobe Acrobat®, etc. In one embodiment, the template is a type of document selected from a group consisting of Excel®, Word®, and PowerPoint®.

In one example embodiment, a non-XBRL business reporting workbook (e.g., "template") is received. The template is a workbook that is provided by regulator(s). Cells of the template are selected by a user. The selected cells are associated with at least two dimensions of the business reporting workbook. For example, the user can select cells of the workbook by performing a user interface selection such as by clicking and dragging a mouse pointer or using keyboard keys, etc., to "paint" or "frame" cells. Each of the cells represents a data point. Each header of a sheet in the workbook represents a dimension. The template is modified by generating a tag in user selected cells. For example, the user can specify a type of tag on an auto tag cell window, as will become more evident. An XBRL version of the business reporting workbook is generated based on the modified template.

The autotagging, provided according to various embodiments, allows a user to significantly speed up the process of creating XBRL business reports by tagging workbooks provided by regulator(s).

Figure 1A:
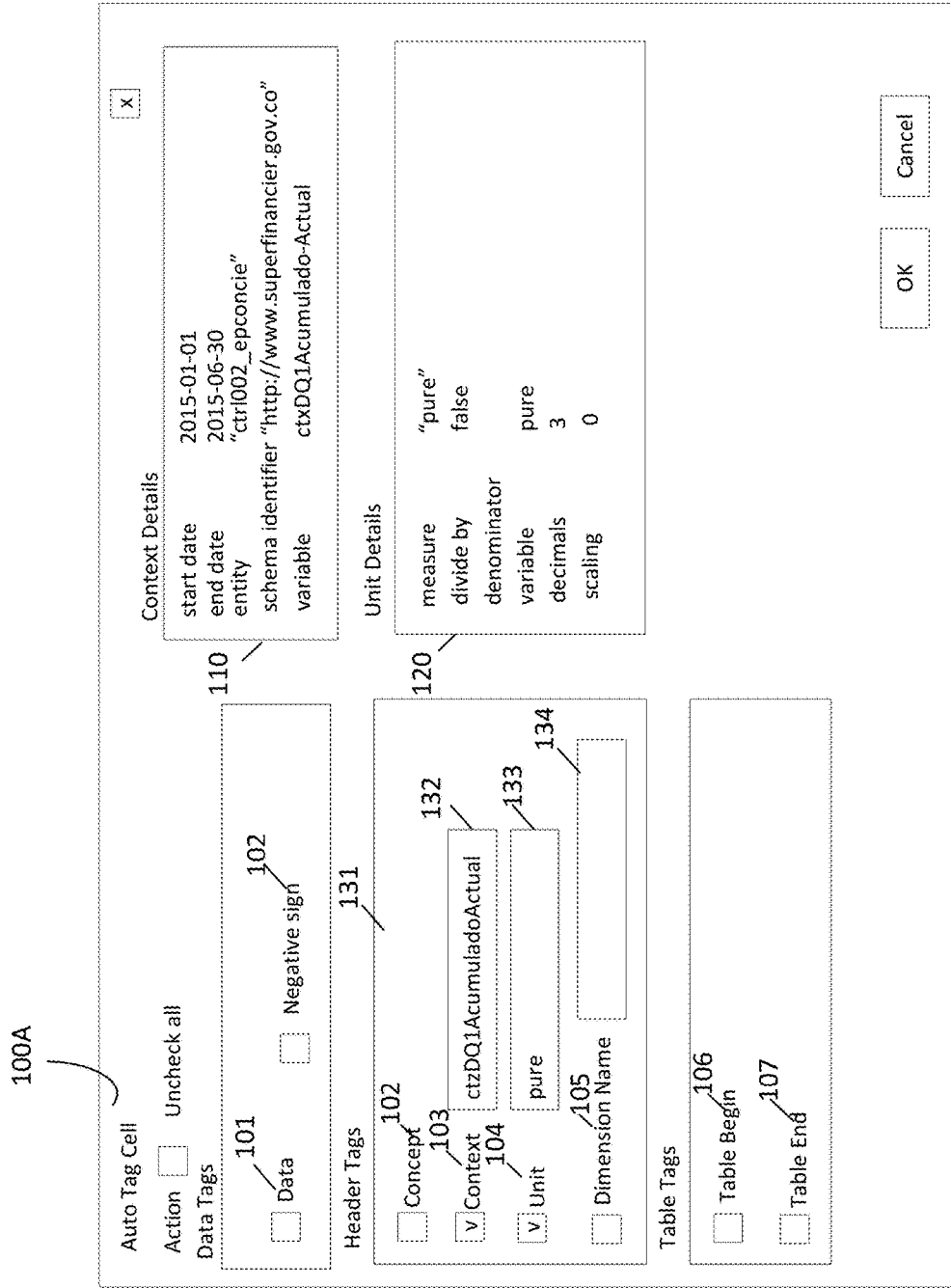
FIG. 1A depicts a window for auto tagging cells (referred to herein as "auto tag cell window"), according to one embodiment.

FIG. 1A depicts a window 100A for auto tagging cells (referred to herein as "auto tag cell window"), according to one embodiment. The auto tag cell window 100A is also referred to as a "dialog." The auto tag cell window 100A enables a user to select one or more tags for tagging a cell. The auto tag cell window 100A provides check boxes for selecting a type of tag for tagging cells. For example, the check boxes are data 101, concept 102, context 103, unit 104, dimension 105, table begin 106, and table end 107 for the respective types of tags that are data, concept, context, unit, dimension, table begin, and table end. Auto tag cell window 100A also provides a negative sign check box 109 for specifying a negative sign. As depicted in FIG. 1A, the unit check box 104 is checked. The check boxes provide user interface controls via user input/selection. Items displayed by a user interface that a user can interact with, such as icons, check boxes, radio buttons, and so on, are examples of user interface controls.

Auto tag cell window 100A provides a data entry field 131 for entering the name of a concept, a drop down menu 132 for specifying a name for a context, a drop down menu 133 for specifying a unit and a data entry field 134 for entering the name of a dimension. Data entry field 131 is positioned beside concept check box 102, drop down menu 132 is positioned beside context check box 103, drop down menu 133 is positioned beside unit check box 104, and data entry field 134 is positioned beside dimension check box 105.

Windows 110, 120 of the auto tag cell window display cell tag information that is entered via the auto tag cell window. Window 110 displays context details and window 120 displays unit details. Decimals and scaling attributes are displayed in the unit details window 120. The cell tag information is stored in the XML document for that cell (also referred to herein as "XML cell"), according to one embodiment.

Figure 1B:
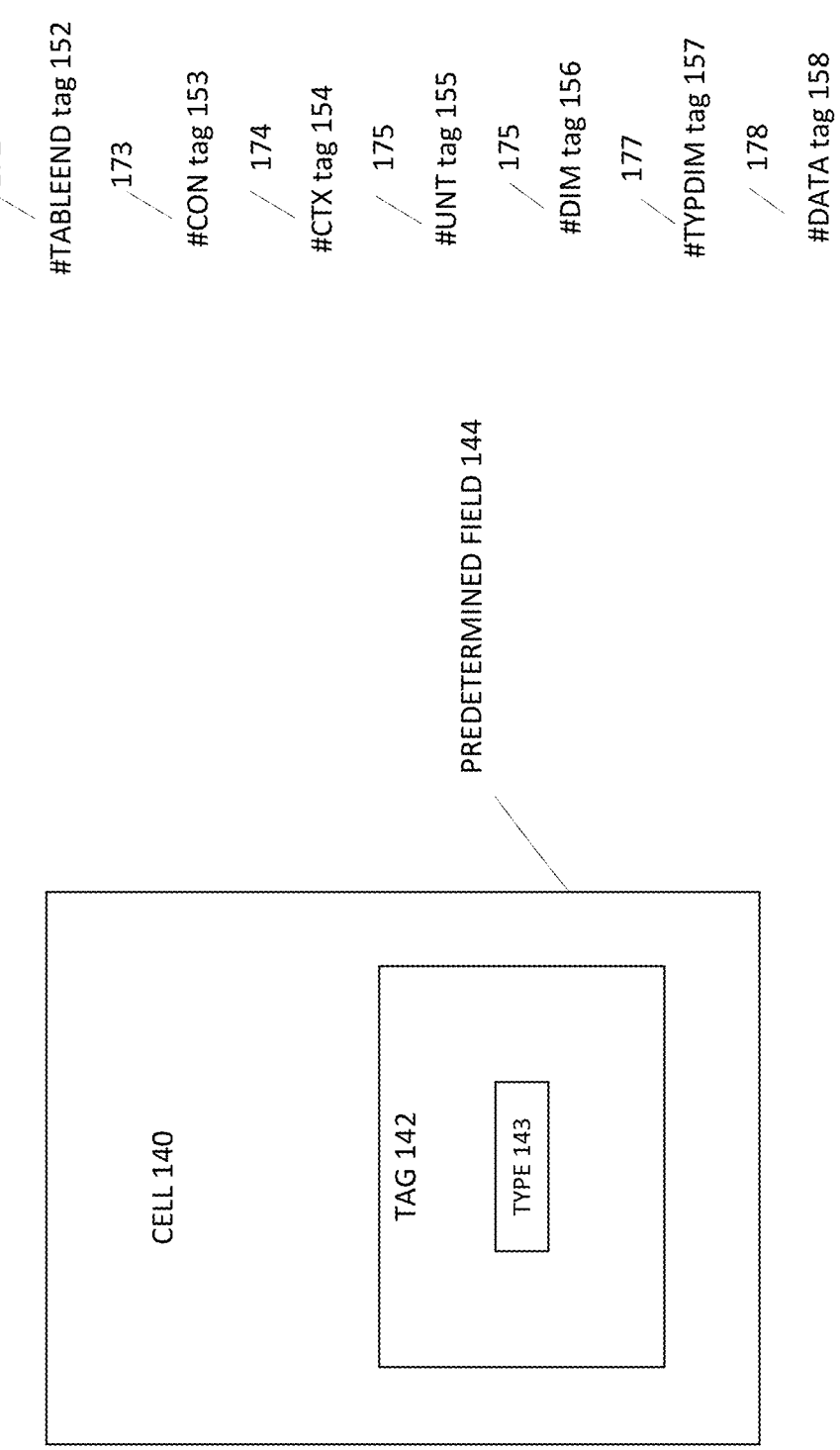
FIG. 1B depicts a block diagram of a cell with a tag 142 that has been generated in the cell, according to one embodiment.

FIG. 1B depicts a block diagram of a cell 140 with a tag 142 that has been generated in the cell 140, according to one embodiment. The tag 142 includes the type 143 of the tag 142, according to one embodiment. The tag 142 has been generated in the cell 140 in a predetermined field 144. Examples of tags are a tablebegin tag 151, a tableend tag 152, a con tag 153, a ctx tag 153, a unt tag 155, a dim tag 156, a typedim tag 157, and a data tag 158. Each of the tags 151-158 have respective types 171-178. For example, the type for the tablebegin tag 151 is tablebegin 171; the type for the tableend tag 152 is tableend 172 and so on. The type 143 inside of the generated tag 142 is one of the types 171-178, according to one embodiment.

In one embodiment, that no further input is needed from the user and the system as part of automatically generating the tag 142 including the type 143 in a comment field that was predetermined by the target format of the modified template. For example, all of the input that is used for automatically generating the tag 142 is obtained, according to one embodiment, from the auto tag cell window 100A, as discussed herein. After the user clicks on the OK button of the auto tag cell window 100A, the information entered in the auto tag cell window 100A is used for automatically generating the tag 142. No further input is needed from the user or the system as part of automatically generating the tag 142, according to one embodiment.

More than one of the check boxes 101-107 may be selected. Further additional information for a tag type may be specified in the auto tag cell window 100A, as discussed herein. Further, according to one embodiment, the tag 142 can include a plurality of tag types 171-178.

A TableBegin tag 151 marks the beginning of a table. Selecting the table begin check box 106 causes the application of the #TABLEBEGIN tag 151 to a specified cell, as discussed herein.

A TableEnd tag 152 marks the end of a table. Checking the table end check box 107 causes the application of the #TABLEEND tag to a specified cell, as discussed herein. According to one embodiment, either #TABLEBEGIN tag 151 or #TABLEEND tag 152 can be applied, but not both for the same cell.

The Concept tag 153 indicates that a specified cell is a concept header. Checking the concept check box 102 causes generation of a #CON comment in the selected cell. "Apply Indexing" is an optional parameter for this type of tag can be used when multiple cells are selected. For example, #CON (index="1") can be used for applying indexing. "name" is an optional parameter when one cell is selected.

A Context tag 154 indicates that any fact data below or to the right of it will have that context. Checking the context check box 103 causes generation of a #CTX comment (e.g., tag) in the specified cell.

A Unit tag 155 indicates that any fact data below or to the right of it will have that unit. Checking the unit check box 104 causes generation of a #UNT comment (e.g., tag) in the specified cell. Optional parameters for this option include "decimals" and "scaling". For example:

UNT($cop,decimals="3",scaling="−3")

More specifically if the decimals or scaling attributes are not defined, various embodiments can use the values that are associated with the unit in the document entity information (DEI) sheet, as discussed herein.

The Dimension tag 156 indicates that the selected cell that is being tagged is an explicit dimension label. Any fact data below or to the right of it will have that dimension. Checking the dimension check box 105 causes generation of a #DIM comment (e.g., tag) in the selected cell.

A Typed Dimension tag 157 indicates that the selected cell being tagged is a typed dimension label. Any fact data below or to the right of it will have that dimension. A check box for typed dimension is not shown. Selecting a typed dimension check box would cause generation of a #TYPDIM comment (e.g., tag) in the selected cell.

A Data tag 158 indicates that a selected cell is a fact cell. Checking the data check box 101 causes generation of the #DATA comment (e.g., tag) in the specified cell.

Figure 2:
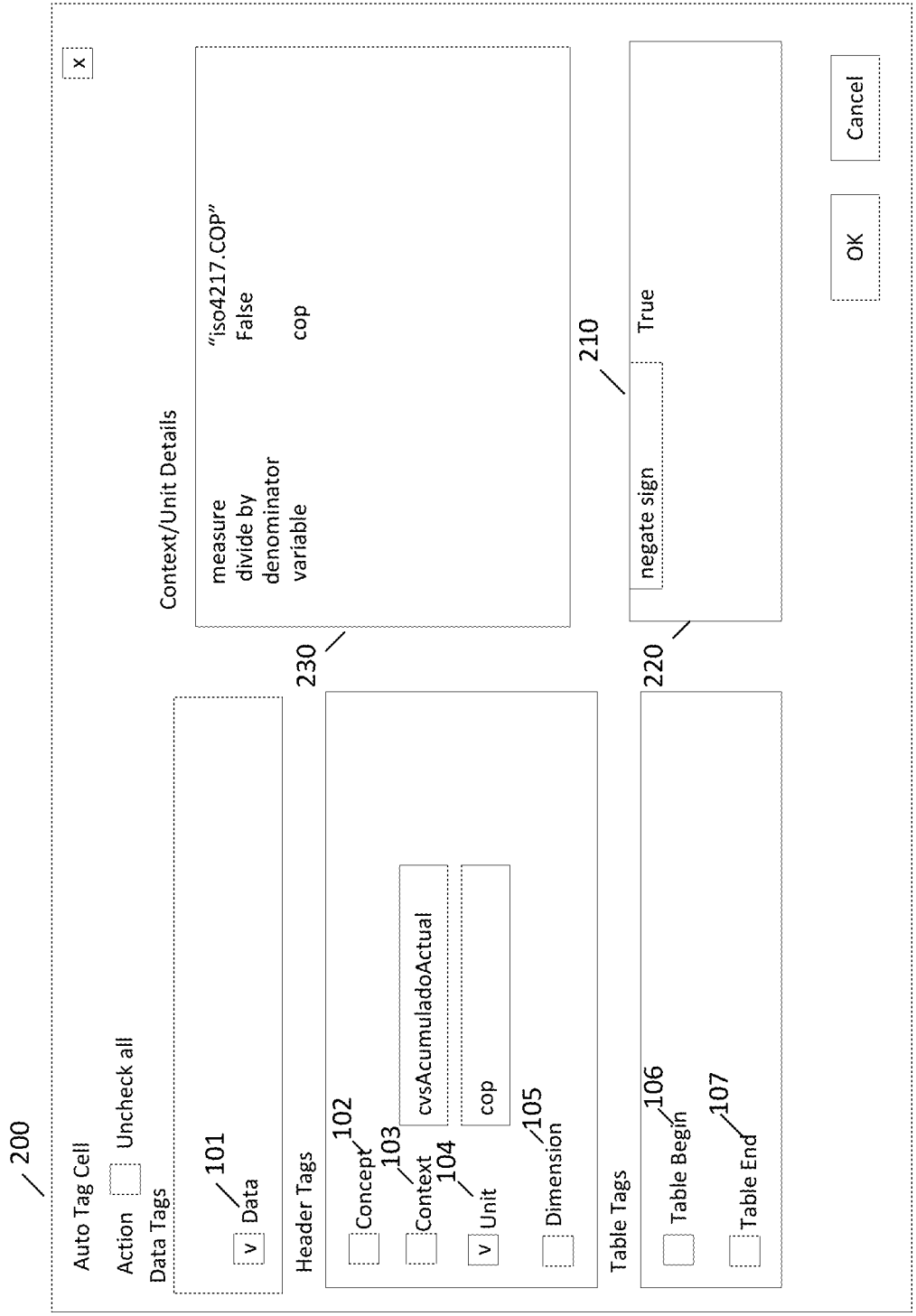
FIG. 2 depicts the auto tag cell window with the data check box and the unit check box checked, according to one embodiment.

FIG. 2 depicts the auto tag cell window 200 with the data check box 101 and the unit check box 104 checked, according to one embodiment. Various embodiments provide for flipping the sign by changing the value of "negative sign" in the optional attributes panel 210 as depicted in FIG. 2, for example, when the data check box 101 is selected. Although FIG. 2 depicts using an attributes panel 210 for flipping of the sign, embodiments are well suited to using other types of user interface controls, such as a check box.

Windows 220, 230 of the auto tag cell window display cell tag information that is entered via the auto tag cell window. The cell tag information is stored in the XML document for that cell (also referred to herein as "XML cell"), according to one embodiment.

FIG. 3 depicts a screen shot 300 after cells have been selected and tagged on a worksheet 800100. Column 310 depicts numbers for rows. The selected cells 320A, 320B are associated respectively with rows 310A and 310B. Rows 310A include rows 19-23 and rows 310B include rows 31-33. The tab 330 and the title 340 indicate that the work sheet is 800100.

As depicted in FIG. 3, the user has taken reporting tables of the business reporting workbook provided by the regulator and selected cells of the table, thus, identifying intersection points within the hypercube that contain table region, concepts, context, units, dimension and data. Various embodiments, as discussed herein, are able to transform these identifiers and apply XBRL tagging automatically to all the fact values, represented by the selected cells, in each network. This saves many weeks of manual preparation and eliminates many user errors that are encountered due to the voluminous and tedious nature of XBRL preparation and validation activity. According to various embodiments, an XBRL version of a business reporting worksheet can be generated in a few minutes or a few hours using a few mouse clicks and user selections, as discussed herein, instead of many weeks or even months of manual activity.

Figure 4B:
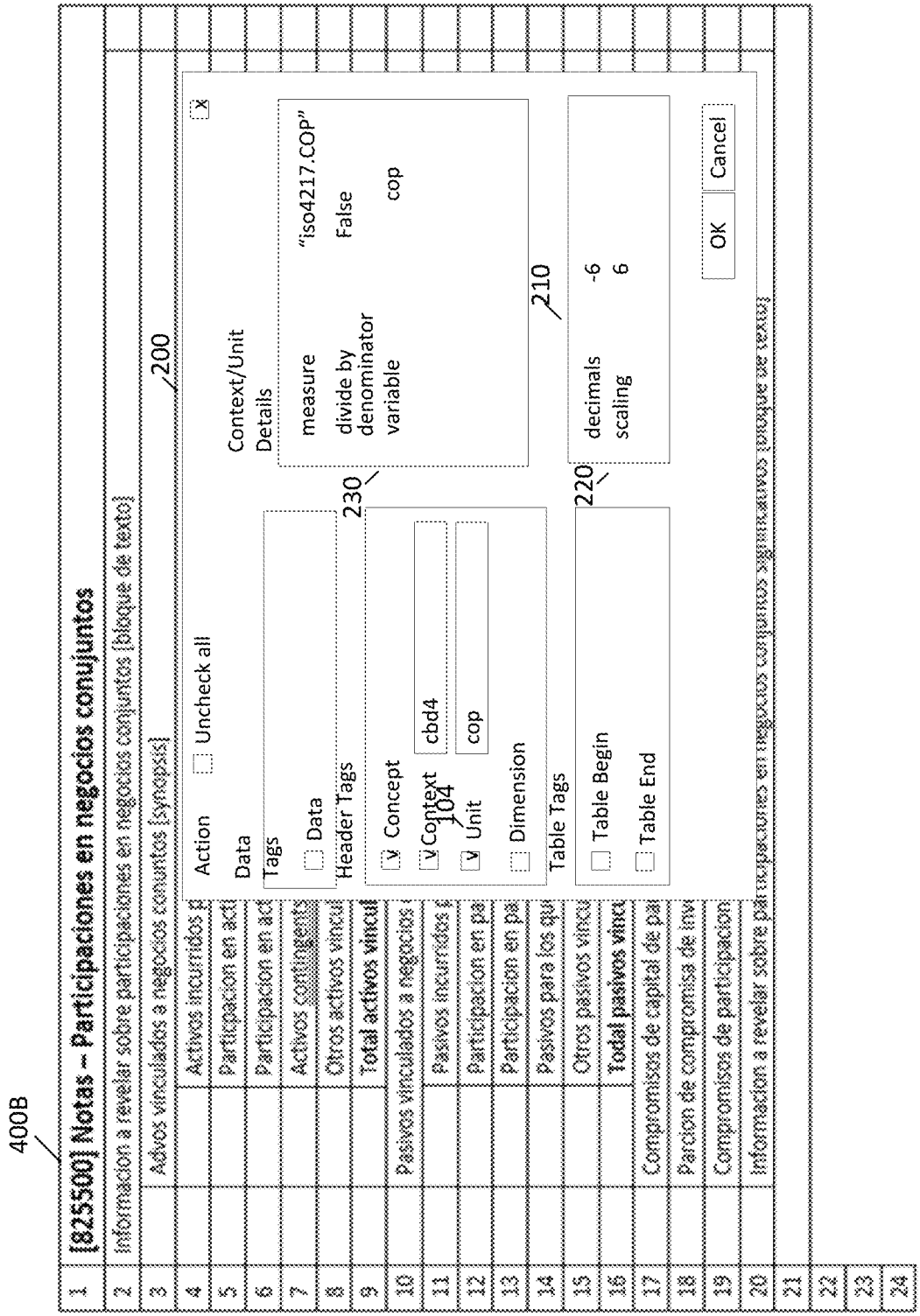
FIG. 4B depicts a screen shot with an auto tag cell window, according to one embodiment

FIG. 4A depicts a screen shot 400A with a warning message 410A indicating that the user selected more than one cell that have different types of tags. In the example, the user selected at least one cell that has a dimension tag and a context tag and another cell that has a unit tag. The warning message 410A allows the user to proceed by selecting "yes" or stop by selecting "no." If the user selects "yes" in the warning message 410A to proceed, the selected different types of tags will be indicated by checkboxes in "Undetermined" state. For example, FIG. 4B depicts a screen shot 400B with an auto tag cell window 100A, according to one embodiment. As depicted in FIG. 4B, some of selected cells had no units as indicated by a shaded out unit check box 104, and some had units, so the unit checkbox is "undetermined." An undermined state could also be used for other types of tags.

Figure 5:
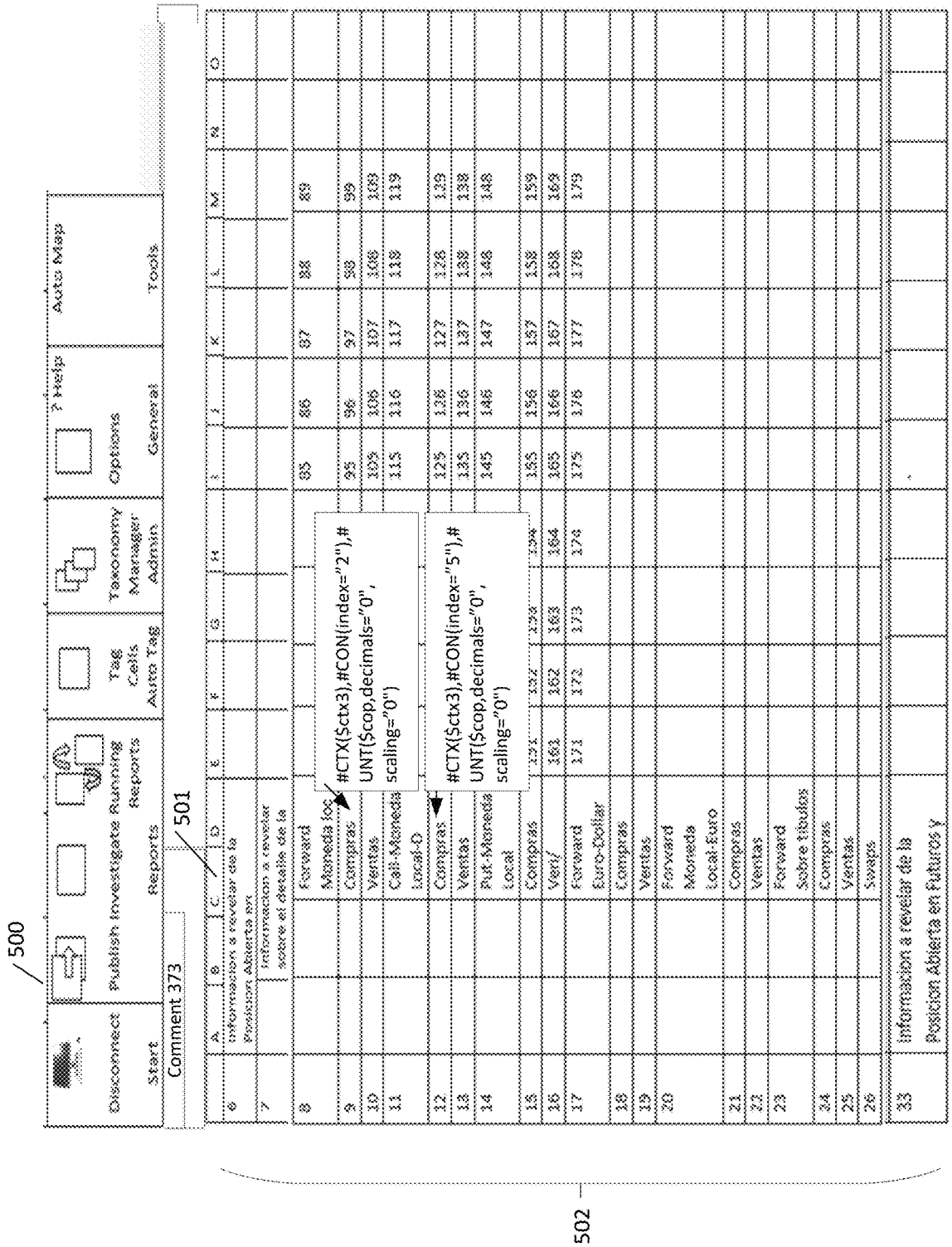
FIG. 5 depicts a screen shot for "network 822390-24," according to one embodiment.

FIG. 5 depicts a screen shot 500 for network 822390-24, according to one embodiment. In some cases, using the concept tag (e.g., #CON) alone is not enough to uniquely identify the concept, for example, when the sheet from the client is processed by the server.

FIG. 5 depicts a reference number 501 for the column C and rows 502 include rows 6-33. Each cell is the intersection of a column and a row. For example, cell C8 is the intersection of header C and row 8 and includes text "Forward Moneda . . . " Cell C23 is the intersection of column C and row 23 and includes text "Forward sobre titulus."

As depicted in FIG. 5, the concepts at cells C9, C12, C15, C18, C21, and C24 have the same concept name "Compras." Further, the concept cells at cells C10, C13, C16, C19, C22, C25 have the same concept name "Ventas." In this case, according to one embodiment, the "index" parameter has been added to each concept as an additional hint to an engine, as will be discussed herein. The index parameter is generated automatically "behind-the-scene" when the user clicks on the "apply indexing" checkbox 630 as depicted in auto tag cell window 650 depicted in FIG. 6.

The screen shot 500 also depicts two annotations 503 and 504. Each of the annotations are associated with one cell. For example, annotation 503 is associated with the cell located at row 9 under columns C and D. Annotation 504 is associated with the cell located at row 12 under columns C and D. According to one embodiment, an annotation of a cell is displayed when the cursor is moved over that cell. An annotation depicts the cell tag information that was entered for that cell using an auto tag cell window, as discussed herein. As depicted in FIG. 5, the tag information includes and the annotation displays #CTX for context, #CON for concept, and #UNT for Unit and the various information for each of the context, the concept and/or the Unit that was stored in the XML cell.

Figure 6:
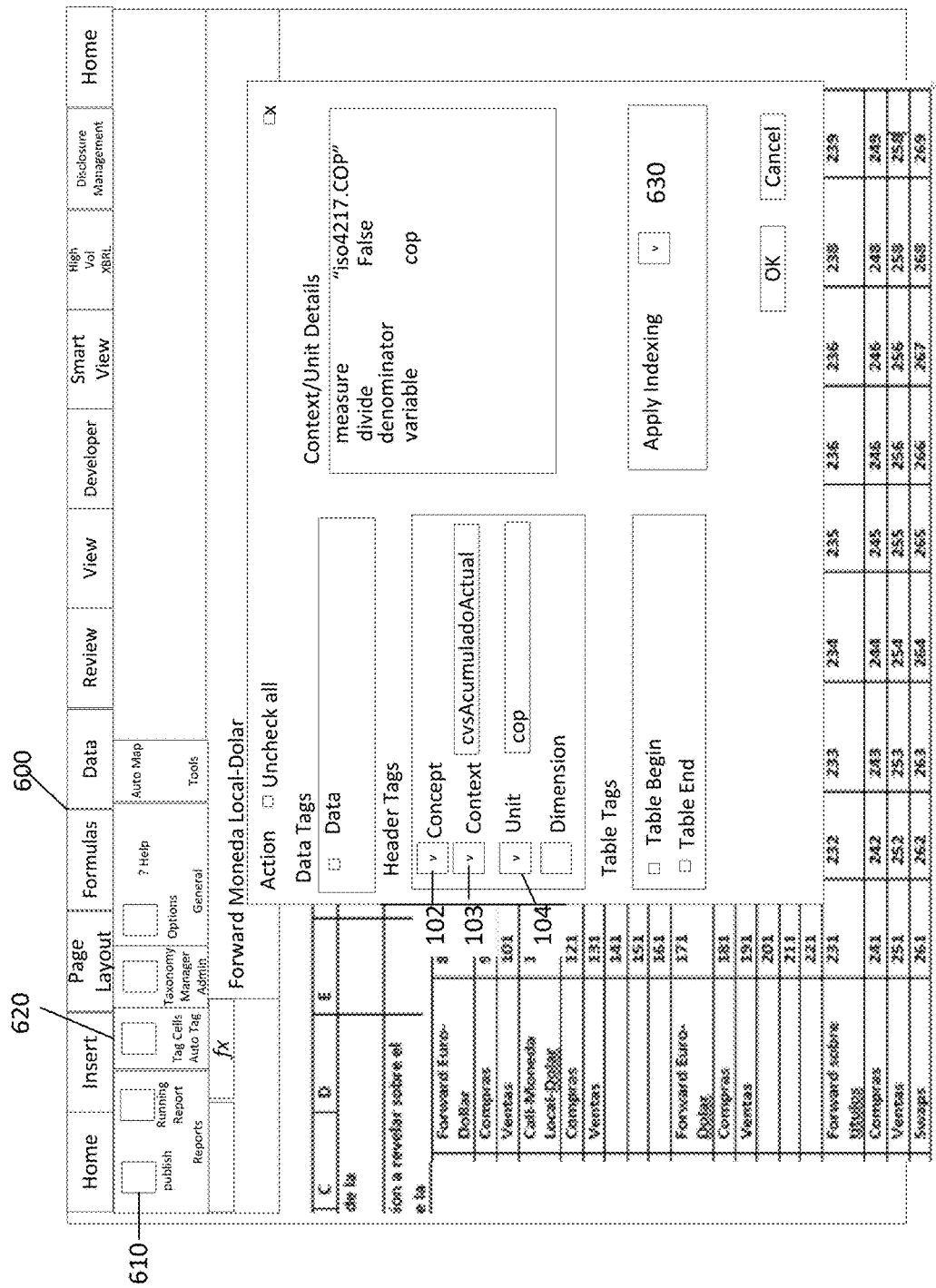
FIG. 6 depicts a screen shot, according to one embodiment.

FIG. 6 depicts a screen shot 600, according to one embodiment. The screen shot 600 depicts a ribbon 610 at the top and an auto tag cell window 650. The ribbon 610 includes a tag cell auto tag icon 620. The auto tag cell window 650 depicts that a user has selected the concept check box 102, the context check box 103 and the unit check box 104. The user has also selected the apply indexing check box 630.

If a user makes a mistake in selecting a range of cells, for example, by selecting more or fewer cells than they intended, various embodiments provide for tagging concepts by selecting a different range and selecting the apply indexing check box 630 again. In response to selecting the apply indexing check box 630, the index will be automatically incremented starting from "1" from the top cell in the specified range.

Figure 7:
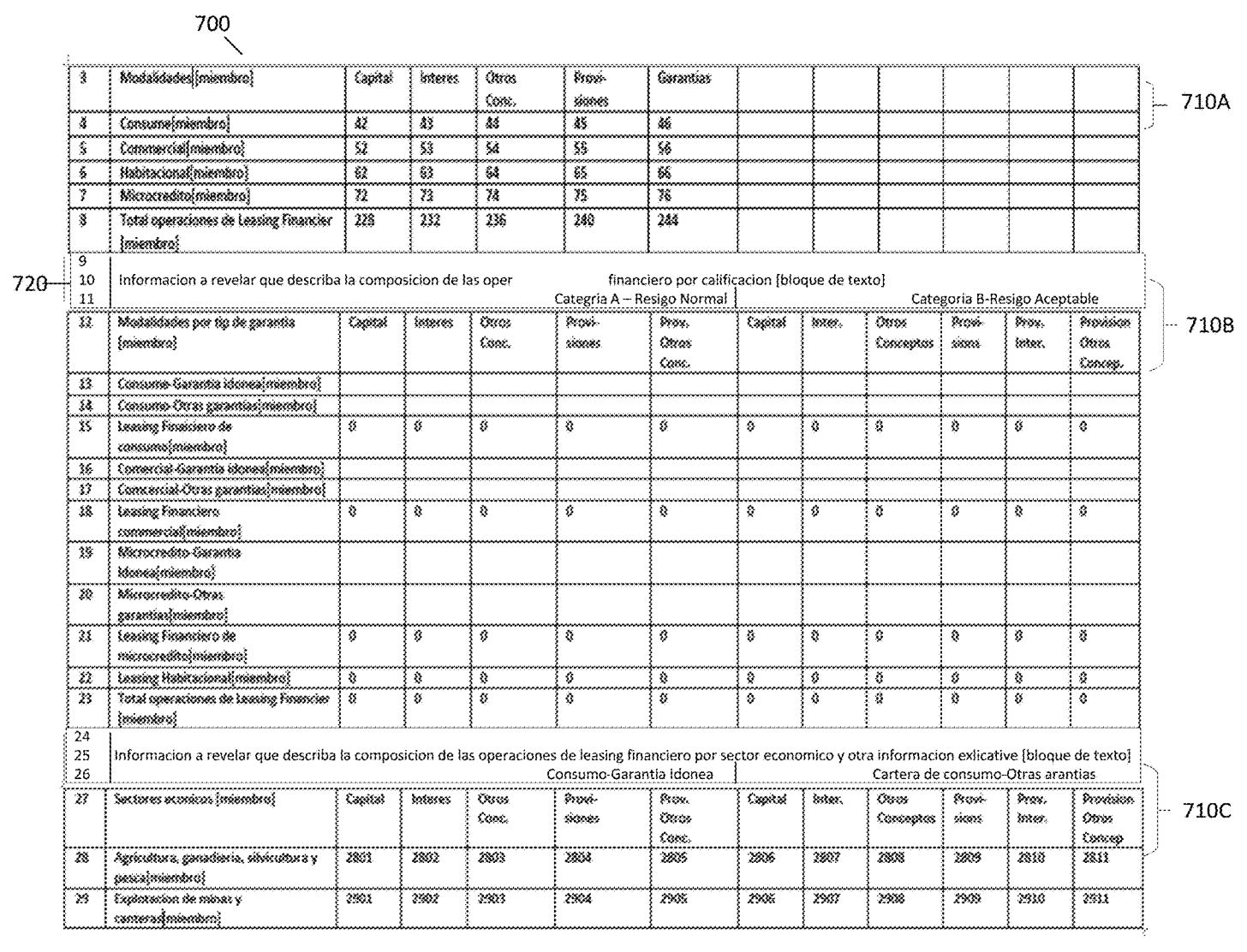
Figure 8:
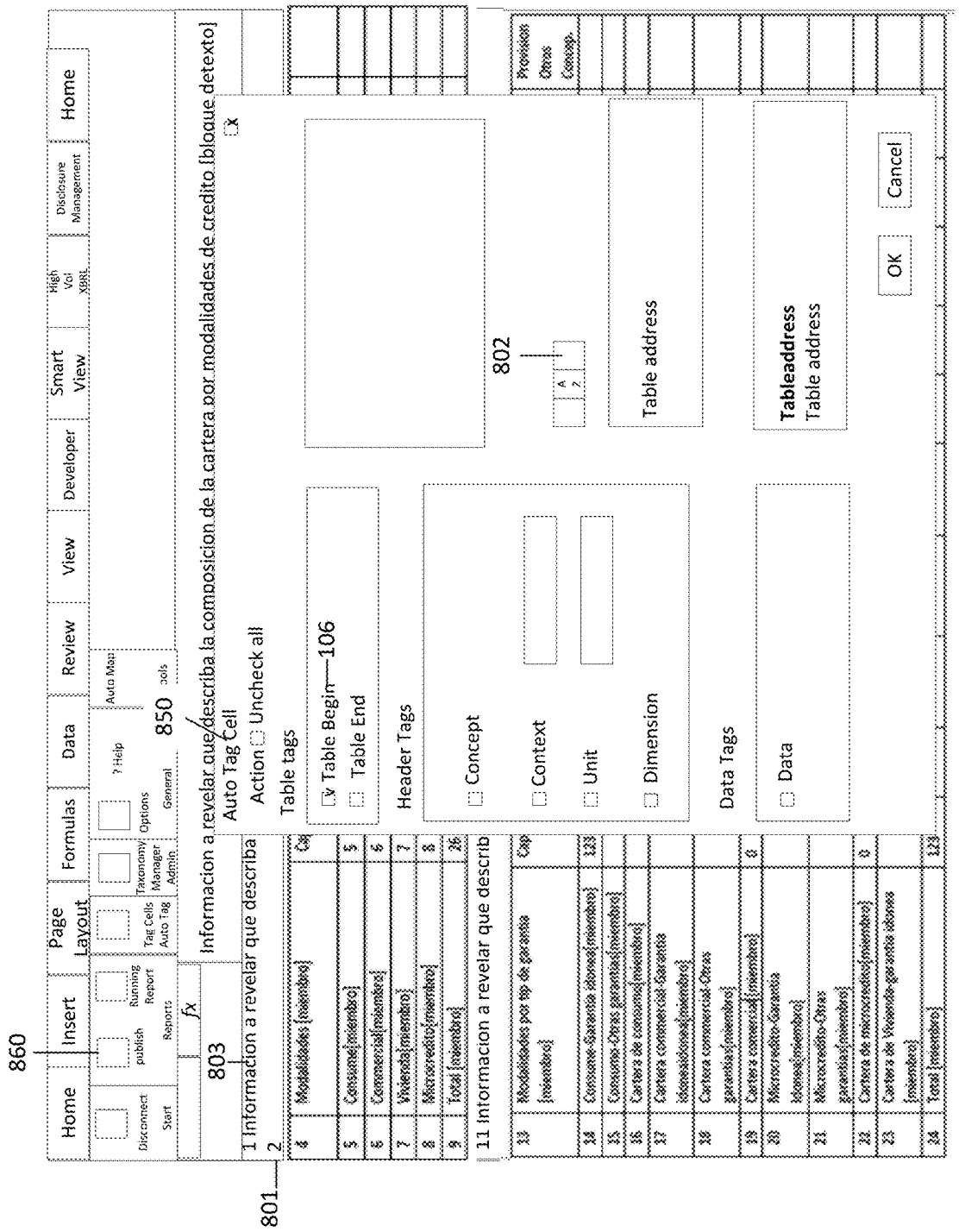

FIGS. 7 and 8 depict respective screen shots 700 and 800 for tagging the beginning of a table, according to various embodiments.

Referring to FIGS. 7 and 8, in some other networks, such as 822390-21 and 822390-22, the same concept exists under several tables. For example, in network 822390-21 concept "Capital" under parent concept "Saldos" exists in cell B4 and B77. In this case, according to one embodiment, the table address can be added when tagging the beginning of the table.

The screen shot 700 depicts headers 710A, 710B, and 710C. Headers 710A includes 6 headers. The headers 710B includes at least 15 headers. Screen shot 700 also depicts 15 headers. The reference number 720 depicts where row 10 is. Screen shot 700 depicts a pop up window 730 that indicates where cell A10 is located.

Screen shot 800 includes the auto tag cell window 850. The table begin check box 106 has been selected in the auto tag cell window 850.

In order to tag the beginning of a table with reference to the tree branch in a taxonomy, which is the textblock preceding the table, a user can insert a "table_begin tag" at location 801 by checking the table begin check box 106, selecting the button 802 in the auto tag cell 850, and pointing to the cell A10 at location 803 preceding the table. Although this example referred to cell A10, embodiments are well suited for inserting a table begin tag at other cells that are at the beginning of various tables. A user can select the publish icon 860 to generate an XBRL version of the business reporting workbook, as will become more evident.

The auto tag cell windows 100A, 200, 650, and 850 are the same auto tag cell window with different inputs selected, as discussed herein. The tag cell window 100A, 200, 650, and 850 is also referred to as a "dialog."

The business reporting workbook is defined according to a taxonomy of networks. Three examples of networks are [52000] Estrado de Flujas de efectivo, metodo indirecto, [51000] Estado de Flujos de efectivo, directo, and [42000] Estado del resultado integral, components ORI presentados antes de impuestos. The reference numbers of various networks are depicted in tabs, titles and so on of the screen shots of sheets of the business reporting workbook. Therefore, each of the tabs has a label with the reference number that identifies a respective network taxonomy. For example, the networks 42000, 800100, 800200, 800300, 800400, 80050, 800600, 811000, 815000, 817000, 818000, 822100, 822390 are represented respectively as tabs in FIG. 3, the text specifying network 825500 is depicted in the title of FIG. 4A, the networks 822390-12, 822390-14, 822390-15, 822390-16, 822390-17, 822390-18, 822390-20, 822390-21, 822390-22, 822390-23, 822390-24, 82300 are represented respectively by tabs in FIG. 5, the networks 822390-5, 822390-6, 822390-7, 822390-8, 822390-9, 822390-10, 822390-12, 822390-14, 822390-17, 822390-18, 822390-23, 822390-24, 8223000, 823180 are represented respectively by tabs in FIG. 6, and the networks 822390-14, 822390-15, 822390-16, 822390-17, 822390-18, 822390-20, 822390-21, 822390-22, 822390-23, 822390-24, 823000, 823180 are represented respectively as tabs in FIG. 8. The networks are also referred to as "network taxonomies."

According to one embodiment, there is a one to one correspondence between a sheet and a network taxonomy. For example, each network taxonomy represents one sheet of the business reporting workbook. Therefore, a user can display a sheet for the business reporting workbook by selecting one of the tabs that represents a network taxonomy.

Figure 9:
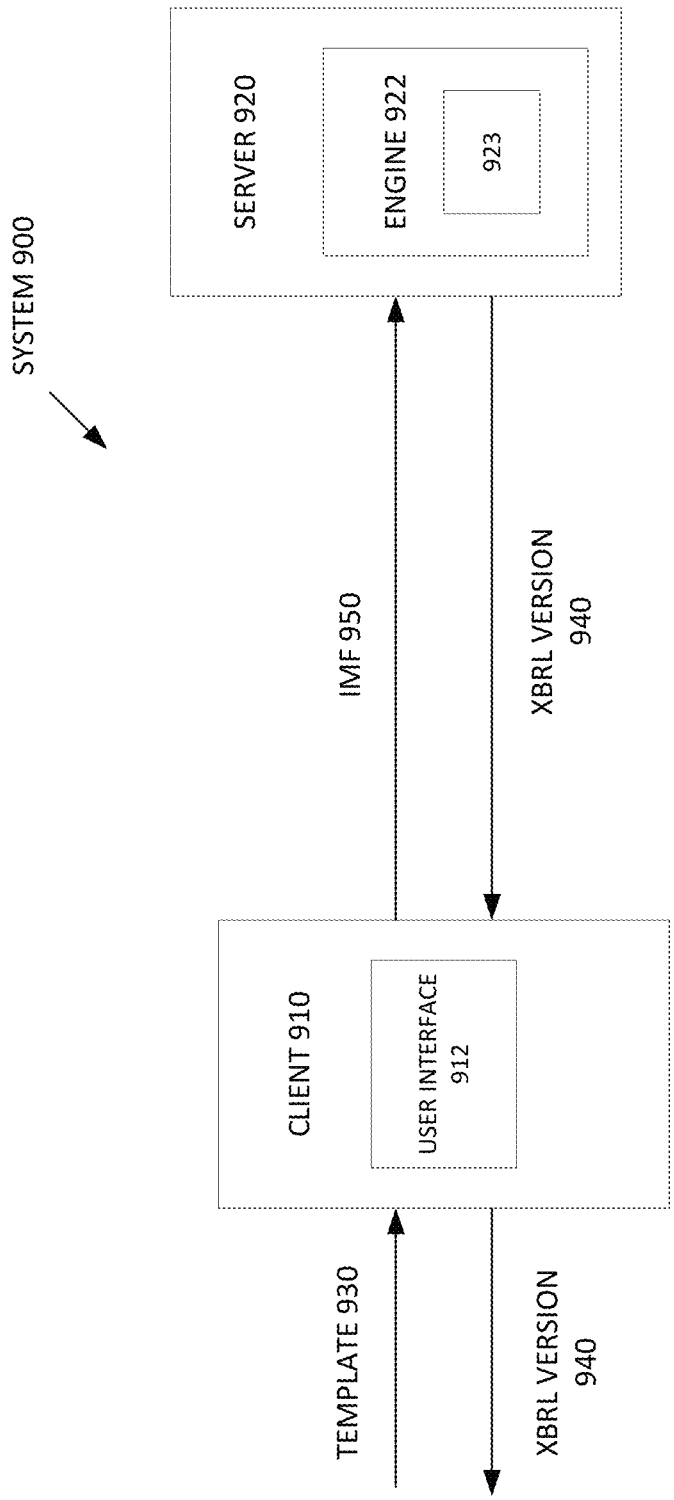
FIG. 9 depicts a block diagram of a system, according to various embodiments.

FIG. 9 depicts a block diagram of a system 900, according to various embodiments.

The system 900 includes a client 910 and a server 920. The client 910 includes a user interface 912 and the server 920 includes an engine 922. The user interface 912 provides various windows, dialogs, screens, error messages as depicted in FIGS. 1-8, 11, 13-16 and 19, according to various embodiments. The engine 922 includes a Quantitative Management Reporting (QMR) service 923. According to one embodiment, the engine 922 is a High Volume XBRL (HVX) engine.

The client 910 receives a template 930. According to one embodiment, a template is a business reporting workbook. Various embodiments have been described in the context of a business reporting workbook in Excel. The user interface 912 receives user inputs specifying cells and the tags to apply to those cells as discussed herein. The user interface 912 creates an intermediate mapping file 950 for a sheet of the business reporting workbook, the user specified cells of that sheet, and the user specified tags for the user specified cells. According to one embodiment, there is one user specified tag for each of the user specified cells. An intermediate mapping file 950 is communicated from the client 910 to the server 920. The QMR service 923 of the engine 922 processes the intermediate mapping file 950. The user interface 912, according to one embodiment, communicates one intermediate mapping file 950 per sheet of the template that the user has selected cells and tags for. The QMR service 923, according to one embodiment, collects the intermediate mapping files 950 for the sheets and generates an XBRL version 940 of the template 930 based on the intermediate mapping files 950. The XBRL version 940 has cells tagged as specified by the user of the user interface 912. The server 920 communicates the XBRL version 940 to the client 910 on behalf of the QMR service 923. The user interface 912 can provide the XBRL version 940 of the business reporting worksheet to the user.

Regulators do not want to see duplicate information from intermediate mapping files. Therefore, according to one embodiment, cache, for example, on the server 920, can be used for removing duplicate intermediate mapping files.

According to another embodiment, the XBRL version 940 remains at the server 920 until it is requested. According to another embodiment, the XBRL version 940 can be provided to a different client instead of or in addition to client 910. The XBRL version 940 can be pushed to a client or pulled to a client.

Figure 10:
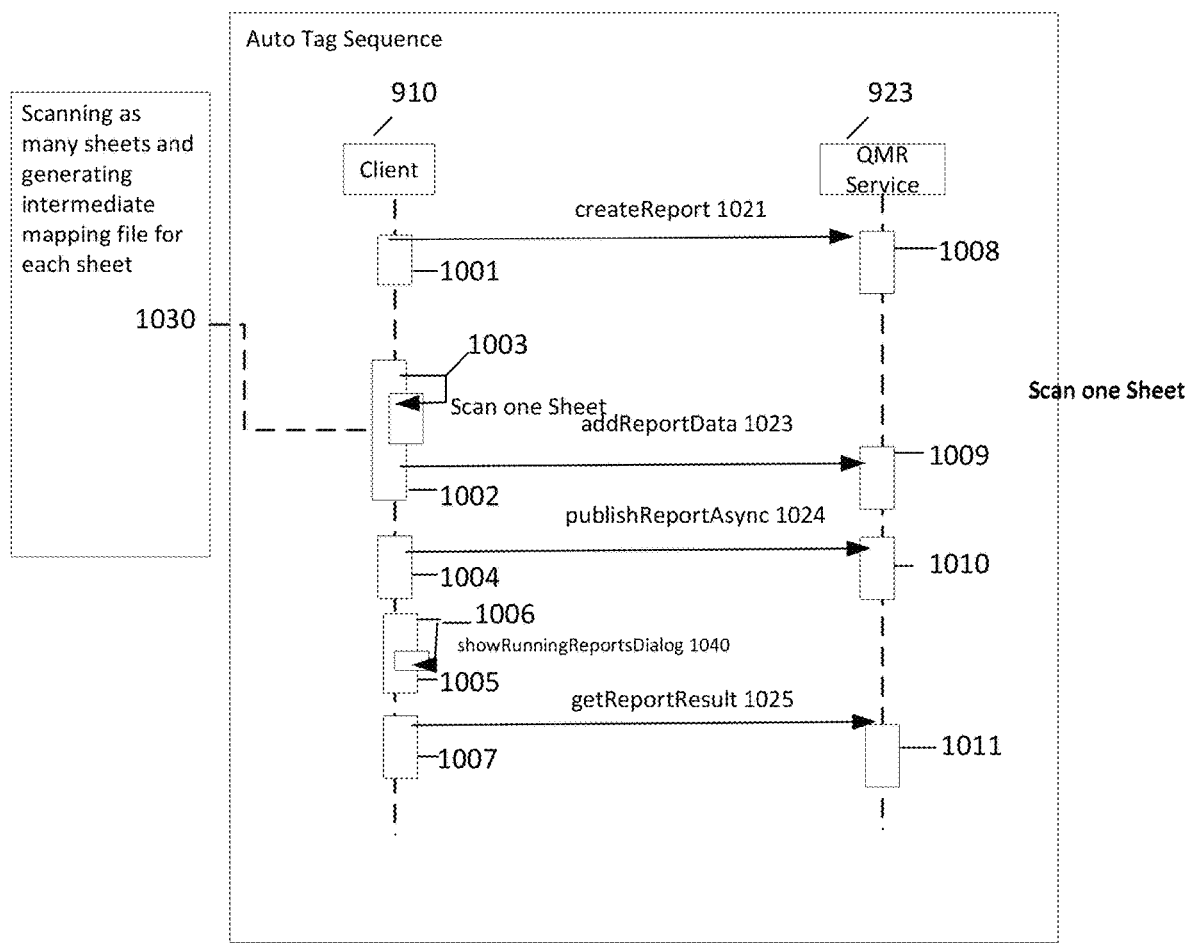
FIG. 10 depicts a communication flow diagram, according to one embodiment.

FIG. 10 depicts a communication flow diagram, according to one embodiment. The diagram depicts communications between the client 910 and the QMR service 923, according to one embodiment.

The client 910 includes logic 1001-1007, according to one embodiment. The engine 922 includes logic 1008-1011, according to one embodiment. The client 910 transmits instructions 1021-1025 to the server 920. According to one embodiment, logic 1021-1007 are a part of the user interface 912 or interact, directly or indirectly, with user interface 912.

More specifically, logic 1001 transmits the createReport instruction 1021 requesting creation and entry of a report identifier in a database. The database on the service 923 will associate accumulated intermediate mapping files (IMFs) 950 and an XBRL version 940 that is generated based on those intermediate mapping files 950 with that report identifier.

Logic 1008 creates and enters the requested report identifier in response to receiving the createReport instruction 1021.

Logic 1002 provides a loop 1003 for scanning multiple workbook sheets and generating an IMF 950 for each sheet as indicated by 1030. The client 910 can use a tool written, for example, in C#, that will scan the template 930 with the user specified tagging information for the user specified cells and generates the intermediate mapping files 950 based on the scanned template 930. Each iteration of the loop 1003 corresponds with scanning one workbook sheet and generation of an IMF 950 that corresponds with that sheet. According to one embodiment, the template 930 is scanned from left to right and from top to bottom. Various embodiments provide for the scan to visit a cell only once, for example, by using the information associated with the tags as discussed herein. The scanning uses, according to one embodiment, the #TableBegin tag and the #TableEnd tag to determine where to begin the scan process for a table and where to end the scan process for that table.

The logic 1002 transmits the IMFs one at a time with an addReportData instruction 1023.

The logic 1009 receives the addReportData instruction 1023 that each contain an IMF corresponding to one sheet. The logic 1009 accumulates the IMFs, for example, in the database at the service 923. The intermediate mapping files 950 are provided to the engine 922 on the server 920 enabling the server 920 to generate an XBRL instance (also referred to herein as an "XBRL version 940" of the template).

Logic 1004 is executed in response to a user selecting the publish icon 860 (FIG. 8). The logic 1004 transmits the publishReportAsync instruction 1024 to logic 1010. In response, the service 923 generates an XBRL version 940 based on the accumulated IMFs 950, as discussed herein.

Logic 1005 provides a showRunningReport Dialog 1040 that a user can check periodically to determine if the logic 1010 has completed generation of the XBRL version 940. The loop 1006, associated with logic 1005, represents the iterations that the user interacted with the dialog 1040. The user can interact with the dialog 1040 one or more times.

When logic 1010 has completed generation of the XBRL version 940, the user can request a copy of it. Logic 1007 transmits the getReportResult instruction 1025 to logic 1011 in response to the user's request. The server transmits the XBRL version 940 in response to receiving the getReportResult instruction 1025.

The XBRL version can be transmitted to the same client that performed logic 1001-1006 or to a different client. For example, logic 1001-1007 can be performed on the same client or subsets of that logic can be performed on different clients. For example, logic 1001-1006 may be performed on one client and logic 1007 may be performed on a different client. Both of the clients may include logic 1001-1007 even though subsets are performed by different clients. The XBRL version 940, according to one embodiment, is transmitted to the client that transmitted the getReportResult 1025 command.

FIG. 11 depicts a screen shot 1100 of a portion 1110 of a sheet of a business reporting workbook, as discussed herein.

The screen shot 1100 depicts a ribbon 1101 and a portion 1110 of a business reporting workbook. The ribbon 1101 includes an icon 1102 for displaying an auto tag cell window, as discussed herein. The screen shot 1100, according to one embodiment, is displayed by a user interface 912.

The displayed portion 1110 of the workbook includes headers H1-H9, rows R1-Rn and cells C11-Cnn defined by those headers H1-H9 and rows R1-Rn. The displayed portion 1100 also includes tabs 1112. Each of the tabs, as discussed herein, can be user selected to cause display of a sheet of the business reporting workbook. Further, as discussed herein, each tab 1112 is associated with one network of a closed taxonomy that defines the business reporting workbook. "Closed taxonomy" is a well-known phrase in the art of XBRL. A "closed taxonomy" is closed to change. The creators of business reports do not change the taxonomy. Each of the headers H1-H9 represents one dimension of the taxonomy. For example, header H1 represents one dimension, header H2 represents another dimension and so on.

Each of the cells C11-Cnn represents a data point, according to one embodiment.

According to one embodiment, the headers H4 and H8 are provided in the shape of a J (also referred to herein as "J shape"). The headers H1, H2, H3 are under the J shape header H4. The headers H6 and H7 are under the J shape header H8. A J shape provides for defining a parent child relationship between dimensions, as represented by headers. Therefore, H1, H2, H3 are children of H4. H6 and H7 are children of H8. A parent child relationship represented by a J shape is associated with an explicit dimension map 1871 (FIG. 18) in an intermediate mapping file.

FIG. 22 depicts a screen shot of a user interface 2200 with a J shape, according to one embodiment. For example, a j shape is used to visually illustrate the structure of the taxonomy. It is used to group related items based on how they are arranged in the taxonomy tree. A regulator typically releases a table in a worksheet, such as an excel worksheet, a structure that includes the j shape 2210 with the dimension parent and the dimension with no child 2220.

More specifically, the screen shot 220 depicts a dimension parent 2210, a dimension with no child 2220, dimension child 1 2211 and dimension child 2 2212. The dimension parent 2210 is a J shape. The J shape 2210 includes a handle 2241 and a head 2242. The handle 2241 is horizontal and the head 2242 is vertical. The handle 2241 is under columns A 2231 and B 2232. The head 2242 is under column C 2233. Dimensions with no child 2220 is under column D 2234. The cells 2211-2258 have the respective values 100, 500, 200, 600, 300, 700, 400, 800. Cells 2211 and 2252 are under column A 2231 and dimension child 2211. Cells 2253 and 2254 are under column B 2232 and dimension child 2 2212. Cells 2251-2254 are also under the handle 2241. Cells 2255 and 2256 are under column C 2233 and the head 2242. Cells 2257 and 2258 are under column D 2234 and the dimension with no child 2220.

The J Shape 2210 aids automated scanning of a user interface spread sheet 2200. For example, the automated scanning could use the J-shape 2210 to assign dimension child 1 2211 to the cell 2251 but not dimension parent 2210 because it is identified that in column A 2231 falls under the handle 2241 of the j shape 2210. For the data points for cells 2255 and 2256, the scanner would assign dimension parent 2210 since column C 2233 is associated with the head 2242 of the J-Shape 2210.

FIG. 23 depicts a screen shot of a user interface 2300 with a J shape 2310, according to one embodiment. The J shape 2310 has a handle 2341 and a head 2342. The handle 2341 is associated with the columns 2370 F-K. Data points for cells 2321-232n are under the head 2342 and data points for cells 2350 are under the handle 2341. The automated scanning of the user interface 2300 uses the j shape 2310 to assign an explicit dimension map with each of the cells 2321-232n under the head 2342 but not assign the dimension "senalado actualmente" specified in the j shape 2310 with each of the cells 2350 that are under the handle 2341. As part of assigning the dimension "senalado actualmente" to the cells 2321-232n, a dimension map (also known as an "explicit dimension map") will be provided in each of the cell definitions for cells 2321-232n of an intermediate mapping file.

The cells 2350 that are under a handle 2341 of a j shape 2310 are related to the cells 2321-232n under the head 2342 of the same j shape 2310. Therefore, the cells 2350 are also associated with the columns 2370 F-K. The relationship can vary depending on the type of spread sheet that the J shape and cells are associated with.

FIG. 24 depicts a cell definition of an intermediate mapping file that includes an explicit dimension map, according to one embodiment. The cell definition 2400 begins with a begin cell tag 2401 and ends with an end cell tag 2402. The value 2403 specifies the value "1207" indicating that this cell definition 2400 is for cell 2321 in FIG. 23. The cell definition 2400 includes an explicit dimension map 2472 for the "senalado actualmente" dimension for the j shape 2310 in FIG. 23. The cell definition 2400, as depicted, includes another explicit dimension map 2471 since cell 2321 is also under another j shape 2360 for the "capital emitido" dimension. The j shapes 2310, 2360 (FIG. 23) and the explicit dimension maps 2471, 2472 (FIG. 24) specify their respective names. For example, j shape 2360 and the explicit dimension map 2471 specify the "capital emitido" dimension name 2474. Further j shape 2310 and explicit dimension map 2472 specify the "senalado actualmente" dimension name 2473.

Although FIG. 24 only depicted one cell definition, each of the cell definitions for cells 2321-232n (FIG. 23) in an intermediate mapping file would include explicit dimension maps for the "capital emitido" and "senalado actualmente" dimensions.

An embodiment provides for automatically scanning a spreadsheet of a user interface for a J shape that specifies a dimension; creating an explicit dimension map for each cell under a vertical head of the J shape, wherein the explicit dimension map represents the dimension; creating cell definitions for each of the cells, wherein each of the cell definitions include the explicit dimension map; and including the cell definitions in the modification of the template. For example, according an embodiment provides for automatically scanning a spreadsheet of a user interface 2200 (FIG. 22), 2300 (FIG. 23) for a J shape 2210 (FIG. 23), 2310 (FIG. 23. That specifies a dimension, such as "Senalado actualmente" in FIG. 23; creating an explicit dimension map 2472 (FIG. 24) for each cell 2255 and 2256 (FIG. 22), 2321-232n (FIG. 23) under a vertical head 2242 (FIG. 22), 2342 (FIG. 23) of the J shape, wherein the explicit dimension map represents the dimension; creating cell definitions 2400 (FIG. 24) for each of the cells 2255 and 2256 (FIG. 22), 2321-232n (FIG. 23), wherein each of the cell definitions include the explicit dimension map; and including the cell definitions in the modification, such as intermediate mapping file 950 (FIG. 9) of the template 930 (FIG. 9).

FIG. 12 depicts a flowchart 1200 of a method of auto-tagging a template of a reporting workbook, according to one embodiment.

At 1210, the method begins.

At 1220, the template of the reporting workbook is received.

For example, referring to FIG. 9, the user interface 912 at the client 910 receives the template 930, as discussed herein. In one embodiment, the template 930 is of a business reporting workbook. FIG. 11 depicts a screen shot 1100 of a portion 1110 of reporting workbook. According to one embodiment, the template 930, according to one embodiment, includes a sheet of a business reporting workbook.

The template is in a first format type. Various embodiments are illustrated with a template that is in Excel®. However, in other embodiments, the template may be or may use another type of document, such as Microsoft Word®, PowerPoint®, Adobe Acrobat®, etc. In one embodiment, the template is a type of document selected from a group consisting of Excel®, Word®, and PowerPoint®. According to one embodiment, the first format type is not a format for a markup language.

At 1230, user specified selection of portions of the template are received. For example, the user can specify portions, such as cells, of the template by painting cells, specifying dimensions and rows that define cells, and/or framing cells. More specifically, the user can paint cells by moving their cursor back and forth over the cells. The user can select cells by clicking on a cell and then dragging their mouse over the cells that they want to select. The user can define cells by specifying headers and rows that define the cells. For example, referring to FIG. 11, the user could select headers H1-H5 and rows 1-3. The user can select headers and rows, for example, by highlighting them. The user can select ranges of headers and ranges of rows. In this example, headers H1-H5 is an example of a range of headers and rows 1-3 is an example of a range of rows. Then the cells C11-C3n that are in those headers H1-H5 and rows 1-3 are selected. The user interface could provide a window or dialog for specifying a range of cells that the user wants to select.

Selected cells C11-Cnn (FIG. 11) can be framed with the #TableBegin tag 151 and the #TableEnd tag 152 (FIG. 1B). For example, the user can place their cursor on cell C11 (FIG. 11) and check the table begin check box 106 (FIG. 1A) to generate a #TableBegin tag 171 (FIG. 1B) in the cell 11 (FIG. 11), as discussed herein. The user can place their cursor on cell Cnn (FIG. 11) and check the table end check box 107 (FIG. 1A) to generate a #TableEnd tag 152 (FIG. 1B) in the cell Cnn (FIG. 11), as discussed herein.

According to one embodiment, the selected portions are associated with at least two dimensions of the business reporting workbook. For example, each header H1-H9 (FIG. 11) represents one dimension of the hypercube. By selecting cells that are associated with two or more of the headers, the selected cells are associated with at least two dimensions of the business reporting workbook.

At 1240, a user specified type for a tag is received.

For example, a user can select an icon 1102 (FIG. 11) that causes an auto tag cell window 100A, 200, 850 to be displayed. A check box 101-107 (FIG. 1A) can be selected on the auto tag cell window 100A, 200, 850, to specify a type 171-178 (FIG. 1B) of tag 151-158 (FIG. 1B) to generate in the selected portions C11-C3n (FIG. 11).

At 1250, a modification of the template is created by automatically generating a tag in a predetermined field of each of the portions based on the user specified type. For example, referring to FIG. 1B, a tag 142 can be automatically generated in a predetermined field 144 of a portion 140 based on a user specified type 171-178, that was specified, for example, using a check box 101-107 (FIG. 1A) of an auto tag cell window 100A, 200, 850. In this illustration, a tag 142 is automatically generated in a predetermined field of the selected portions C11-C3n (FIG. 11).

FIG. 1B depicts one example of a modification, such as the cell 140 that has been modified to include a generated tag 142. The user interface 912 can generate the modification based on the template 930, the user specified cells C11-C3n and the user specified type 171-178 of tag 151-158. An intermediate mapping file 950 that reflects the modification can be communicated from the client 910 to the server 920. According to one embodiment, a user can select the publish icon 860 that initiates generation of the modification, the intermediate mapping file 950 and in turn the XBRL version 940 of the business reporting workbook, as discussed herein.

In one embodiment, that no further input is needed from the user and the system as part of automatically generating the tag 142 including the type 143 in a comment field that was predetermined by the first format type.

For example, all of the input that is used for automatically generating the tag 142 is obtained, according to one embodiment, from the auto tag cell window 100A, as discussed herein. After the user clicks on the OK button of the auto tag cell window 100A, the information entered in the auto tag cell window 100A is used for automatically generating the tag 142. No further input is needed from the user or the system as part of automatically generating the tag 142, according to one embodiment.

At 1260, a version of the reporting workbook is generated based on the modification of the template. For example, the QMR service 923 can generate an XBRL version 940 of the reporting workbook based on the intermediate mapping file 950, as discussed herein.

The version 940 is in a second format type. For example, the second format type is a markup language format, such as XBRL format or XML format. Embodiments are well suited to the version having a different format type. For example, although features of the embodiments are described with respect to XBRL or other forms of XML it is possible that other types of markup language or even other types of descriptions can be used with different embodiments. Other particular features, formats or characteristics used in the descriptions of the example embodiments may be changed.

At 1270, the method ends.

According to one embodiment, the predetermined field includes a comment field. FIG. 1B depicts an example of a predetermined field 144. According to one embodiment, a comment field is predetermined by the target format of the modified template 930.

According to one embodiment, the automatically generating of the tag further comprises: including the type in the tag. FIG. 1B depicts examples of a generated tag 142 and types 171-178. Examples of tags that can be generated in a cell 140 include tags 151-158.

According to one embodiment, the type is selected from a group consisting of table begin, table end, concept, context, unit, dimension, typed dimension, and data. For example, the type can be table begin 171, table end 172, concept 173, context 174, unit 175, dimension 176, typed dimension 177, and data 178. The annotations 503, 504 depict types of tags, such as #CTX, #CON, #UNT, as discussed herein According to one embodiment, the portions of the template include cells. FIG. 11 depicts examples of portions C11-Cnn that can be cells, such as cell 140.

According to one embodiment, the receiving of the user specified selection of the portions of the template further comprises: receiving information indicating the portions were specified using one of painting, framing, and specifying dimensions and rows.

According to various embodiments, the receiving of the user specified type for of the tag further comprises: receiving user input to select a user interface control for an auto tag cell window; displaying the auto tag cell window in response to receiving the user input selecting the user interface control; and receiving the type of the tag from the auto tag cell window. More specifically, receiving user input to select a user interface control 1102 for an auto tag cell window 100A; displaying the auto tag cell window 100A in response to receiving the user input selecting the user interface control 1102; and receiving the type 171-178 of the tag from the auto tag cell window 100A.

According to one embodiment, the second format type is selected from a group consisting of Extensible Markup Language (XML) and eXtensible Business Reporting Language (XBRL) version of the business reporting workbook.

According to various embodiments, the creating of the modification of the template further comprises: creating the modification of the template for one sheet of the reporting workbook; communicating the modification from a client to a server; receiving modifications for all of sheets of the reporting workbook; and generating the version at the server based on the received modifications. For example, an example of a modification is a cell 140. The modification can be communicated from a client 910 to a server 920, for example, as an intermediate mapping file 950. Intermediate mapping files 950 for each of the sheets of a reporting workbook can be collected at the server 920. FIG. 11 depicts a screen shot of a portion 1100 of a reporting workbook. The QMR service 923 generates a version 940 based on the received modifications.

According to one embodiment, the reporting workbook is defined by a closed taxonomy. According to one embodiment, each network of the closed taxonomy represents one sheet of the reporting workbook. As discussed herein, each tab 1112 FIG. 11) is associated with one network of a closed taxonomy that defines the business reporting workbook.

According to one embodiment, the template 930 is a type of document selected from a group consisting of Excel, Word, and Power Point.

As depicted in FIGS. 3, 11 and 12, the user has taken reporting tables of the business reporting workbook provided by a regulator and selected cells of the table, thus, identifying intersection points within the hypercube that contain table region, concepts, context, units, dimension and data. Various embodiments, as discussed herein, are able to transform these identifiers and apply XBRL tagging automatically to all the fact values, represented by the selected cells, in each network. This saves many weeks of manual preparation and eliminates many user errors that are encountered due to the voluminous and tedious nature of XBRL preparation and validation activity. According to various embodiments, an XBRL version of a business reporting worksheet can be generated with a few minutes to a few hours using a few mouse clicks and user selections, as discussed herein, instead of many weeks or even months of manual activity.

The cells that are tagged are considered intersection points in a hypercube. Various embodiments can use these intersection points, what is connected to them and apply all of the XBRL tags to the intersection points.

Various embodiments provide for determining which labels in the taxonomy correspond with labels associated with rows or headers. For example, the label of a row or header in a worksheet of the user interface may not exactly match the label that goes with that row or header in the taxonomy. More specifically, the corresponding labels may differ, for example, in that one has the word "of" ("de" in Spanish) or "and" ("y" in Spanish). However, various embodiments are well suited for determining what label in a taxonomy corresponds with a label in a row or header despite a certain amount of difference.

As discussed herein, if the decimals or scaling attributes are not defined with respect to the unit tag, the software can use the values that are associated with the unit in the document entity information (DEI) sheet, as discussed herein.

According to one embodiment, the DEI sheet is a reserved sheet to allow the user to enter information about the following DEI variables:

1. Taxonomy to Use
2. Scheme to use in contexts
3. Entity to use in contexts
4. Context Definitions
5. Unit Definitions
6. Default Decimals Definition According to one embodiment, the DEI sheet is manually typed. FIG. 13 depicts an example of a screen shot of a DEI sheet 1310, according to one embodiment. According to one embodiment, a page 1300 of the user interface 912 that can be used for entering the DEI sheet 1310. For example, a window or dialog with various fields can be used to facilitate entering the DEI variables.

The DEI sheet 1310 has the name "DEI"; begins with the token DEI_BEGIN 1311; and ends with the token DEI_END 1312.

The syntax for defining DEI Variables includes a DEI variable type, variable name, and variable value. The DEI sheet 1310 has respective columns 1320, 1330, and 1340 for the DEI variable types, variable names and variable values. Further the DEI sheet 1310 has rows 1350 that are numbered 1-19. For example, according to various embodiments, the syntax for defining DEI variables is:

<DEI Variable Type><Variable Name>=<Variable Value>
where:
  <DEI Variable Type> 1320: This defines the type of the variable; it could be taxonomy to signify that that variable we are defining is taxonomy for example. It has the following valid values:
    Taxonomy (depicted at row 2 of Col. 1320): It means that a taxonomy is being defined and the value expected is the taxonomy namespace being used.
    Entity (depicted at row 3 of Col. 1320): The entity that will be used in context definitions.
    Scheme (depicted at row 4 of Col. 1320): The scheme that will be used in context definitions.
    Ctx (depicted at row 5-8 of Col. 1320): Defines a context. It could be in a form of a range or instant. The syntax can be one of the following two:
      <DATE>{<ENTITY VARIABLE>, <SCHEME VARIABLE>}
      <DATE-BEGIN>-<DATE-END>{<ENTITY VARIABLE>, <SCHEME VARIABLE>}

FIG. 14 depicts some common examples of defined contexts as displayed in a portion of a screen shot, according to one embodiment.
  Unit 1401: Defines a unit that is used for tagging. It can be in the form of a simple measure or measure/denominator. Examples of optional parameters are:
    Decimals 1402, such as "−6"
    Scaling 1403, such as "6"
  Table 1 below depicts some common examples of defined units:

TABLE 1

| unit | cop= | "iso4217:COP"{decimals="−6",scaling="6" | ; |
| unit | shares= | "shares"{decimals="0",scaling="0" | ; |
| unit | usd_per_share= | "USD"/"shares"{decimals="0"} | ; |

<Variable name> 1330: This is a unique variable identifier, according to one embodiment. The DEI Grammar uses the variable name 1330 to start with the letter (A-Z; a-z) followed by 0 or more of the capital or small letters/digits/underscore. According to one embodiment, when this rule for <Variable name> 1330 is violated the error message 1500, 1501 will be displayed similar to that shown in FIG. 15.
  <Variable value> 1340: This will assign the value to the variable, according to one embodiment. The rules described above apply for the variable values 1340 for contexts, units, taxonomy namespace, entity identifier, and scheme. According to one embodiment, if the rules for <variable value> 1340 are violated, the error message 1601, 1602 will be displayed similar to that shown in FIG. 16.

The DEI sheet 1310 is bounded, according to one embodiment, by keywords DEI_BEGIN 1311 and DEI_END 1312.

Each line in the DEI sheet 1310 ends with a line separator semicolon ";" as depicted in in column C 1340 to prevent the grammar from being violated and the parser from throwing an error while parsing the DEI sheet.

According to one embodiment, the compound unit "cop_per_share" in the last example above in Table 1 both the numerator "COP" and denominator "shares" are in quotes.

Although the description has been described with respect to particular embodiments thereof, these particular embodiments are merely illustrative, and not restrictive. For example, although various embodiments have been described in the context of Excel, various embodiments are well suited for the templates to be other types of documents, such as word or power point. Word narrative could be used to highlight a group of paragraphs for a disclosure and have the highlighted portion one color. There are levels (levels 1-4) of tags in XBRL. Therefore, according to one embodiment, for Federal Communications Commission (FCC) purpose, one color could be a level 1 tag, another color could be a level 2 tag and so on. The individual narratives could be highlighted based on the network they are in to allow the user to auto tag a word document.

Although various embodiments were described in the context of a client server system, it should be apparent to one of ordinary skill in the art that various embodiments could be implemented as a standalone application. For example, the user interface 912 and the engine 922 could both part of a single application. Further, the single application could execute one computer instead of a client server system. Although specific types and organizations of data may be described in specific examples herein, it should be apparent that other types of data organization can be used. For example, in other embodiments there may be one or more data points per cell, a header may represent one or more dimensions, non-rectangular groups of cells might be selected for tagging, etc.

Figure 17:
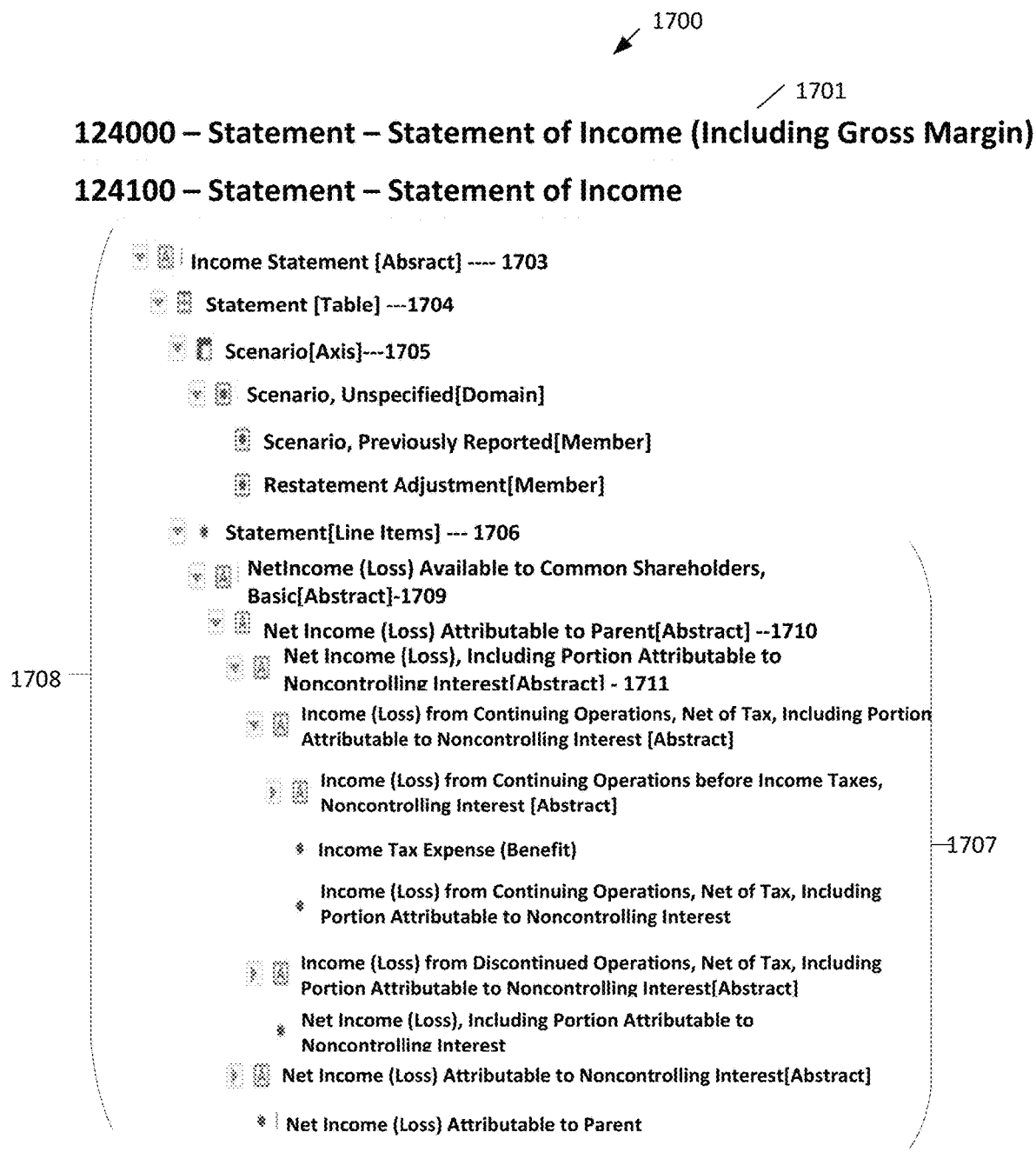
FIG. 17 depicts a portion of a taxonomy, according to one embodiment.

FIG. 17 depicts a portion 1700 of a taxonomy, according to one embodiment. As can be seen, the taxonomy is represented as a tree (also referred to herein as a "taxonomy tree") where various lines in the taxonomy tree have parent, child, grandchild, and so on types of relationships with respect to each other.

Lines 1701, 1702 each represent a respective network 124000 and 124100. A portion 1708 of the network 124100 is depicted in an expanded form. Network 12400 at line 1701 is not expanded. The respective lines 1704 and 1705 for the statement table and the scenario axis provide dimensional information. The lines of portion 1707 below the statement line item 1706 each represent an element (also known as a "concept").

Aspects are associated with each of the elements. Examples of aspects are the network the element is in, the depth of the element in the taxonomy tree for that network, the location of the element in the taxonomy tree for that network, and the name associated with the element. For example, lines 1709, 1710, and 1711 are examples of elements. Elements 1709-1711 are in network 124100. Each of the elements 1709, 1710, 1711 is in a different location of the taxonomy tree for the network 124100. Element 1709 is above element 1710 which is above element 1711. Further, element 1710 is deeper than element 1709 and 1711 is deeper than 1710. Therefore, according to one embodiment, 1710 is the child of 1709 and 1711 is the child of 1710 and the grandchild of 1709.

The name of element 1709 is "Net Income (Loss) Available to Common Stockholders, Basic." The name of element 1710 is "Net Income (Loss) Attributable to Parent" and so on for the other elements.

Fuzzy logic, such as an inverted look up, is performed using the aspects associated with a cell, as will become more evident.

FIG. 18 depicts a portion 1800 of an intermediate mapping file, according to one embodiment.

According to one embodiment, the portion 1800 is in an XML document as indicated at location 1801. The intermediate mapping file includes information for each cell that is selected in a workbook sheet, as discussed herein. For example, XML cell definitions 1810 and 1820 each correspond with different selected cells of a workbook sheet.

Both 1810 and 1820 begin with a begin cell tag (e.g., "<cell>") and end with an end cell tag (e.g., "</cell>"). An XML cell definition 1810, 1820 is determined from information the user tagged that cell with using the auto tag cell window and a DEI sheet 1310. The primary item maps 1831, 1832 include the identifiers 1812, 1822 of the respective cells. The cell identifier 1812 is $M$1 and the cell identifier 1822 is $F$9. The cell identifiers 1812 and 1822 are from the cell identifiers for the cells in the workbook. For example, the pop up window 730 depicts a cell identifier $A$10 for a cell the workbook.

The value "822390-1" for scheduleName, according to one embodiment, is the network and can be obtained from the workbook.

The concept maps 1841 and 1842 also include names 1813, 1823 for those respective concepts that were obtained from the worksheets provided by the regulators. A concept name 1813, 1823 may not match the corresponding name for that cell in the taxonomy. Concept name 1813 is "Informacion a reveler de activos financieros [bloque de texto]" and concept name 1823 is "saldo antes de cuentos correctos."

Various embodiments are provided for determining the taxonomy's element name for that cell, as discussed herein. To-concept 1811 and 1821 are examples of calls statements to the to-concept logic. Additional examples of to-concept call statements are to-concept("802300", "Concept Label") and to-concept("802300", "Concept Label|Concept LabelChild"). According to one embodiment the to-concept 1811, 1821 provides fuzzy logic for determining the taxonomy element name that corresponds with a cell's concept name 1813, 1823. According to one embodiment, the fuzzy logic performs in inverted lookup, as discussed herein. According to one embodiment the fuzzy logic can be performed by any of 923, 1009, 1010, and 1011

For example, fuzzy logic can tokenize the cell's concept name. In this illustration, assume that the cell's concept name is "cash on hand." It can be tokenized and mapped to a set of potential taxonomy element names "cash," "hand," and/or "cash on hand." The set of potential taxonomy element names are the search results from the inverted look up. Fuzzy logic and inverted look ups are well known in the art. For example, various internet searches are known to perform inverted look ups. Fuzzy logic is a known approach to computing based on degrees rather than "true or false" (1 or 0) Boolean logic. The search results are ranked in the order of best fit to least fit based on the degrees provided by the fuzzy logic. If the fuzzy logic gets confused, the result in the first position of the search results can be used.

Similarly, fuzzy logic of a to-dimension 1872 can be used to map a cell's dimension name 1873 to the taxonomy's dimension name. Further, in a similar manner, to-domain fuzzy logic could be used to map a cell's domain name to a taxonomy's domain name. As discussed herein, fuzzy logic, such as an inverted lookup, can be used to map a cell's concept name to a taxonomy element name. Examples of cell concept names are 1813 and 1823, and examples of taxonomy element names are at lines 1709-1711.

The network 822390-1 parameter that is also passed into the to-concept functions 1811 and 1821 can be obtained from the workbook, according to one embodiment.

The ContextMap 1851 has a schema, entity, startDate and endDate. The value "http://www.superfinancier.gov.co" for the schema variable is obtained, according to one embodiment, from the DEI sheet 1310 at row 4, Col. 1340 of FIG. 3. The value "123456789" for the entity variable is obtained, according to one embodiment, from the DEI sheet at row 3, col. 1340 of FIG. 3. The startDate and the endDate variables for ContextMap 1851 are set respectively to the values of '2015-01-01' and '2015-06-30' indicating a duration of time from that start date to that end date. The start and end date values are obtained, according to one embodiment, from the DEI sheet 1310 at row 5, col. 1340 of FIG. 3.

The ContextMap 1852 has the same schema and entity as ContextMap 1852. The startDate and endDate values are the same indicating that this is an instant context for one day. AS depicted in the intermediate mapping file the value for both the startDate and endDate variables is "2015-01-01," which can be obtained from the DEI sheet 1310 at row 8, Col. 1340 of FIG. 3.

The UnitMap 1861 has parameters for numerator, decimal and scale. The values for these can be obtained from the DEI sheet 1310. For example, the numerator value "iso4217.cop" can be obtained from the DEI sheet 1310 at row 10, col. 1340 of FIG. 3.

A parent child relationship represented by a J shape, as represented by headers H4 and H8 (FIG. 8), is associated with an explicit dimension map 1871 (FIG. 8) in an intermediate mapping file. For example, a dimension map in an intermediate mapping file can reflect that dimensions for headers H1, H2, H3 are children of a dimension for header H4 in a workbook, for example, in an explicit dimension map 1871.

Various information can be used as input (e.g., search criteria) to the fuzzy logic, such as aspects, as discussed herein, and/or information from a concept map 1841, 1841, including the cell's concept name 1813, 1823.

The cell's concept name can be tokenized. For example, assume that the cell's concept name is "cash on hand." It can be tokenized and mapped to a set of potential taxonomy element names "cash," "hand," and/or "cash on hand." The set of potential taxonomy element names are the search results from the inverted look up. Fuzzy logic and inverted look ups are well known in the art. For example, various internet searches are known to perform inverted look ups. Fuzzy logic is a known approach to computing based on degrees rather than "true or false" (1 or 0) Boolean logic. The search results are ranked in the order of best fit to least fit based on the degrees provided by the fuzzy logic. If the fuzzy logic gets confused, the result in the first position of the search results can be used.

An intermediate mapping file provides for at least mapping cell concept names to taxonomy names and the ability create an XML version 940 from almost any size of reporting workbook. For example, according to one embodiment, an intermediate mapping file is transmitted separately from a client 910 to a server 920 for each sheet in the template which prevents or reduces network bottle necks and allows for the communication and processing of any size template of a reporting workbook. The intermediate mapping file enables producing XBRL version 940 in a timely manner even when the reporting workbook and associated template 930 are extremely large and complex.

FIG. 19 depicts corresponding portions of a workbook and a taxonomy for the same network, according to one embodiment. The workbook and the taxonomy are depicted in respective screen shots.

For example, FIG. 19 depicts a portion 1901 of a workbook and a portion 1902 of a taxonomy for the network 21000. FIG. 19 uses lines indicating what cell concept names (also called "cell labels") in the workbook correspond with taxonomy element names (also called "taxonomy concept names") in the taxonomy. For example, the cell concept name "ifrs:CurrentAssetsAbstract" maps to the taxonomy element name "Activos Corrientes [synopsis];" the cell name "irs:CashAndCashEquivalents" maps to the taxonomy element name "Efectivo y equivalents al efectivo," and so on as depicted in FIG. 19.

As discussed herein, the cell concept names are specified in the to-concept functions 1811, 1821 of the intermediate mapping file and fuzzy logic is used to map them to their respective taxonomy element names.

Cells, such as C11-Cnn (FIG. 11), in a workbook can be selected as discussed herein, for example by painting, clicking, specifying and/or framing. The selected cells can be tagged with "auto tag information" using an auto tag window, such as auto tag window 100A (FIG. 1A), as discussed herein. An annotation 503, 504 (FIG. 5) can be created for each of the tagged cells based on the auto tag information.

An intermediate mapping file 950 (FIG. 9) can be created for each workbook sheet. An intermediate mapping file includes a cell definition based on the auto tag information for each cell and corresponding information from a DEI sheet. Examples of information from the DEI sheet include the cell identifier 1812 and schedule name of the primary item map 1831; to-concept and its parameters of the concept map 1841, 1842; schema, entity, startDate and endDate from the ContextMap 1851, 1852; and numerator, decimal and scale of the UnitMap 1861; and information of the explicit dimension map 1871. J shapes, such as H4 and H8 (FIG. 11), can be used as a part of determining relationships, such as parent, child, grandchild and so on, between dimensions. The intermediate mapping file 950 (FIG. 9), according to one embodiment, reflects the relationships between the dimensions as represented by a J shape. The explicit dimension map 1871 can reflect the relationships between the dimensions.

Referring to FIG. 9, the intermediate mapping files 950 can be transmitted from a client 910 to a server 920 where the intermediate mapping files can be accumulated. Cache can be used to remove duplicate intermediate mapping files, as discussed herein.

The information in the intermediate mapping file 950 (FIG. 9) and the aspects for each selected cell from the taxonomy (also called "taxonomy aspects"), as depicted in FIG. 17, can be used for mapping the cell concept names to the taxonomy element names. For example, the network name that is a parameter in the to-concept 1811, 1821 (FIG. 18) can be used to locate the network in the taxonomy. FIG. 17 depicts a portion 1700 of a taxonomy, according to one embodiment. As discussed herein, lines 1701 and 1702 (FIG. 17) represent networks in a taxonomy. As discussed herein, the to-concept 1811, 1821 (FIG. 18) also has a parameter for the cell concept name from the reporting workbook. Examples of taxonomy aspects that are also used for the mapping of the cell concept names 1813, 1823 to the taxonomy element names (depicted at lines 1709-1711 of FIG. 17) include at least the depth of the element in the taxonomy tree for that network, the location of the element in the taxonomy tree for that network, and the name associated with the element, as discussed herein. FIG. 19 depicts lines indicating what cell concept names (also called "cell labels") in the reporting workbook correspond with taxonomy element names (also called "taxonomy concept names") in the taxonomy.

Fuzzy logic, such as an inverted look up, can use the aspects of the taxonomy for the network and the cell concept name specified in the to-concept 1811, 1821 (FIG. 18) to determine the taxonomy element names that correspond with the workbook concept names. The taxonomy element names, instead of the cell concept names, can be used in the XML version 940 (FIG. 9), as discussed herein.

Various other information from the cell definitions 1810, 1820 (FIG. 18), as discussed herein, can also be used as part of creating an XML version 940 (FIG. 9) based on the intermediate mapping files 950. As discussed herein, the XML version 940 includes information from the one or more intermediate mapping files 950 (FIG. 9) which in turn was obtained from various sources, such as at least the workbook, the cell auto tag information, the DEI sheets. The XML version 940 can include any or all of the information from one or more cell definitions 1810, 1820 in an intermediate mapping file 950. Further, the XML version 940 can include information from the taxonomy, such as the taxonomy element names, as discussed herein. As discussed herein, the XML version 940 is an XBRL version of a business reporting workbook that is in an XBRL format that the regulators want.

Various embodiments provide for an apparatus comprising: one or more processors; and a tangible processor-readable storage device including instructions for: receiving a template of a reporting workbook; receiving user specified selection of portions of the template, wherein the portions are associated with at least two dimensions of the reporting workbook; creating a modification of the template by associating a type of tag with the portions; and generating an Extensible Markup Language (XML) version of the reporting workbook based on the modification of the template.

Figure 20:
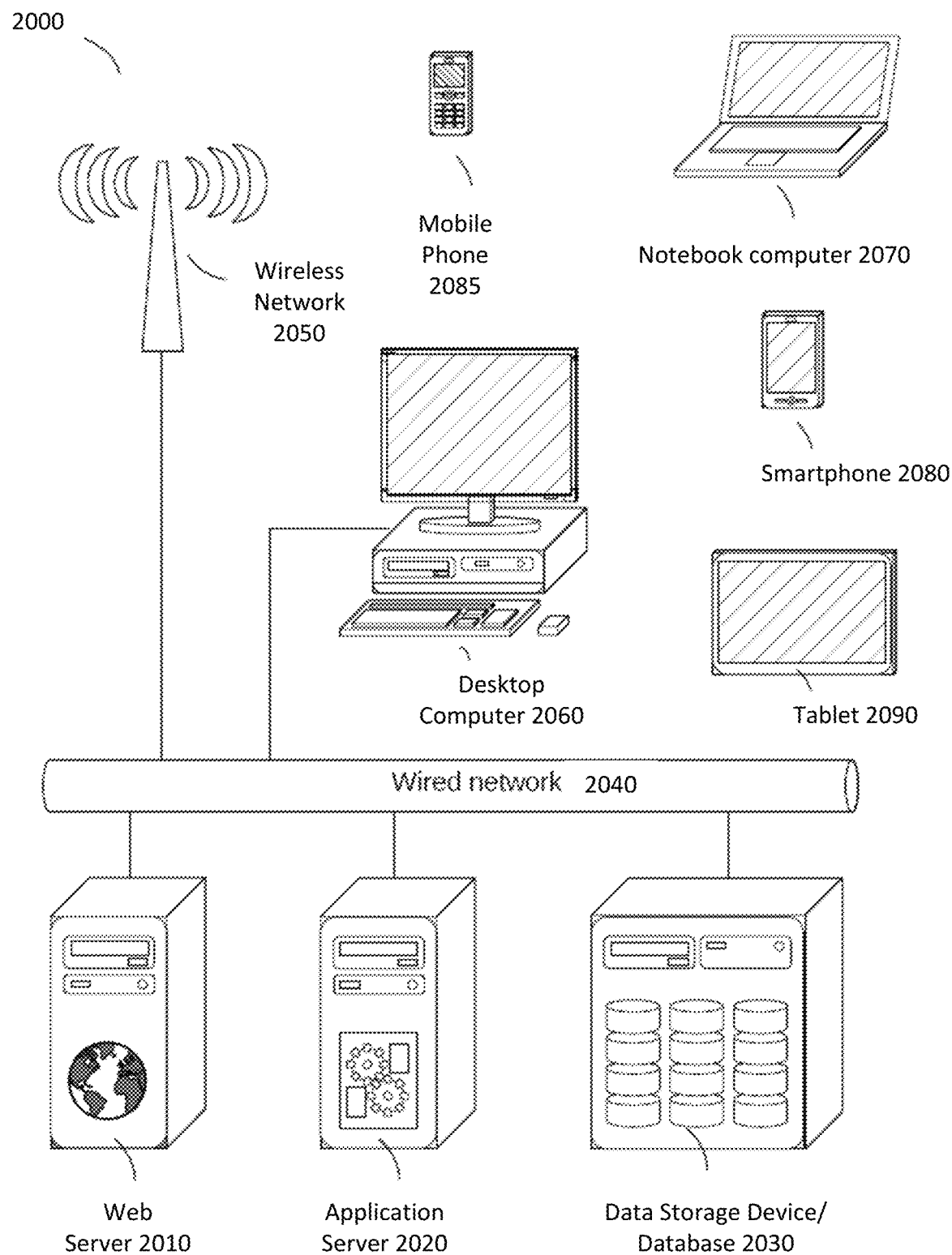
FIG. 20 is a general block diagram of a system and accompanying computing environment usable to implement various embodiments of FIGS. 1A-19, 22-24.

FIG. 20 is a general block diagram of a system 2000 and accompanying computing environment usable to implement various embodiments of FIGS. 1A-19, 22-24. The example system 2000 is capable of supporting or running various hardware and/or software modules and associated methods discussed with reference to FIGS. 9 and 10. Note that certain embodiments may be implemented using one or more stand-alone applications (for example, residing in a user device) and/or one or more web-based applications implemented using a combination of client-side and server-side code.

The general system 2000 includes user devices 2060-2090, including desktop computers 2060, notebook computers 2070, smartphones 2080, mobile phones 2085, and tablets 2090. The general system 2000 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 2000 is shown with five user devices, any number of user devices can be supported.

A web server 2010 is used to process requests from web browsers and standalone applications for web pages, electronic documents, enterprise data or other content, and other data from the user computers. The web server 2010 may also provide push data or syndicated content, such as RSS feeds, of data related to enterprise operations.

An application server 2020 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 2020 are adapted to process input data and user computer requests and can store or retrieve data from data storage device or database 2030. Database 2030 stores data created and used by the data applications. In an embodiment, the database 2030 includes a relational database that is adapted to store, update, and retrieve data in response to SQL format commands or other database query languages. Other embodiments may use unstructured data storage architectures and NoSQL (Not Only SQL) databases.

In an embodiment, the application server 2020 includes one or more general-purpose computers capable of executing programs or scripts. In an embodiment, web server 2010 is implemented as an application running on the one or more general-purpose computers. The web server 2010 and application server 2020 may be combined and executed on the same computers.

An electronic communication network 2040-2050 enables communication between user computers 2060-2090, web server 2010, application server 2020, and database 2030. In an embodiment, networks 2040-2050 may further include any form of electrical or optical communication devices, including wired network 2040 and wireless network 2050. Networks 2040-2050 may also incorporate one or more local-area networks, such as an Ethernet network, wide-area networks, such as the Internet; cellular carrier data networks; and virtual networks, such as a virtual private network.

The system 2000 is one example for executing applications according to an embodiment of the invention. In another embodiment, application server 2010, web server 2020, and optionally database 2030 can be combined into a single server computer application and system. In a further embodiment, virtualization and virtual machine applications may be used to implement one or more of the application server 2010, web server 2020, and database 2030.

In still further embodiments, all or a portion of the web and application serving functions may be integrated into an application running on each of the user computers. For example, a JavaScript application on the user computer may be used to retrieve or analyze data and display portions of the applications.

With reference to FIGS. 9 and 10 and 20, the client 910 and the server 920 of FIGS. 9 and 10 may be implemented in whole or in part via one or more of the desktop computer 2060, notebook computer 2070, smartphone 2080, mobile phone 2085, tablet 2090, of FIG. 20 and/or other computing devices. In a particular example embodiment, the computing devices 2060-2090 run browsers, e.g., used to display user interfaces as shown in FIGS. 1A-8, 11, 13-16, 19, 22 and 23.

In a particular example embodiment, browsers of the client 910 and server 920 of FIGS. 9 and 10 connect to the Internet, represented by the wired network 2040 and/or wireless network 2050 as shown in FIG. 20, to access one or more network-coupled servers, databases, and/or associated cloud-based functionality, as represented by the modules 912, 922 of FIG. 9 and modules 1001-1011 of FIG. 10. Note that one or more of the web server 2010, application server 2020, and data storage device or database 2030 shown in FIG. 20 may be used to host software corresponding to the modules 912, 923, 1001-1011, as detailed more fully below.

In the particular example embodiment, the client 910 and server 920 of FIGS. 9 and 10 run in a cloud computing environment that includes a collection of plural web servers 2010, application servers 2020, and data storage devices 2030 shown in FIG. 20. For example, in a particular example embodiment, the client 910 of FIG. 9 runs one or more client devices 960, 970, 980, 985, 990 and the server 920 of FIG. 9 runs on one or more server devices 910, 920.

A process cloud service may employ a networked database, e.g., the data storage device 2030 of FIG. 20, to store files and other objects used by a given software program being developed. Server-side development environments may be accessible to developers via browsers. The development environments may be backed by the PCS, such that developed software application files are stored in the PCS database corresponding to the one or more of the data storage devices 2030 of FIG. 20. Various types of data structures, as described herein, can be stored on one or more data storage devices 2030. Examples of data structures that can be stored on the one or more data storage devices include template 930, intermediate mapping file 950, XML version 940, taxonomy 1700, and portion 1800 of an intermediate mapping file. These data structures may be stored remotely or may be co-located with the device that accesses it. For example, the template 930 and the XML version 940 may be stored locally at the client 910 or remotely from the client 910, or a combination thereof. The intermediate mapping file 950 and the XML version 940 may be stored locally at the server 920 or remotely from the server 920, or a combination thereof.

A document cloud may include document management functionality in communication with folder structures and documents and may incorporate functionality for adding rich metadata documents and folders. The document management functionality may include MetaData Services (MDS) for characterizing folders and documents and associated structures with various types of metadata. The document management functionality may further include software (which may include a combination of webpage code from a web server 2010 of FIG. 20 and supporting application code of an application server 2020 of FIG. 20, where the webpage code may call the application code using web services, APIs, etc.) for generating one or more customer UI display screens, e.g., UI display screens presented via browsers of the client 910 or the server 920 of FIG. 9, or a combination thereof.

In the particular example embodiment, the UI display screens (examples of which are shown in FIGS. 1A-8, 11, 13-16, 19, 22 and 23) include accompanying user interface controls and associated options. Example options include options to browse, create, delete, define, upload, download, etc., folders, structures, and documents, etc., as maintained via the folder structures and documents.

Note that in the particular example embodiment, browsers used by the client 910 and/or the server 920 of FIG. 9, interface with web servers 2010 shown in FIG. 20 to access websites and accompanying webpage code, which is backed by applications used to implement the modules 912, 922, 1001-1011. The webpage code of the web servers 2010 of FIG. 20 use web services, APIs, and/or other interfacing mechanisms to communicate with application software hosted on application servers 2020 of FIG. 20 of the cloud, which includes a collection of web servers 2010, application servers 2020, and data storage devices 2030 of FIG. 20.

Figure 21:
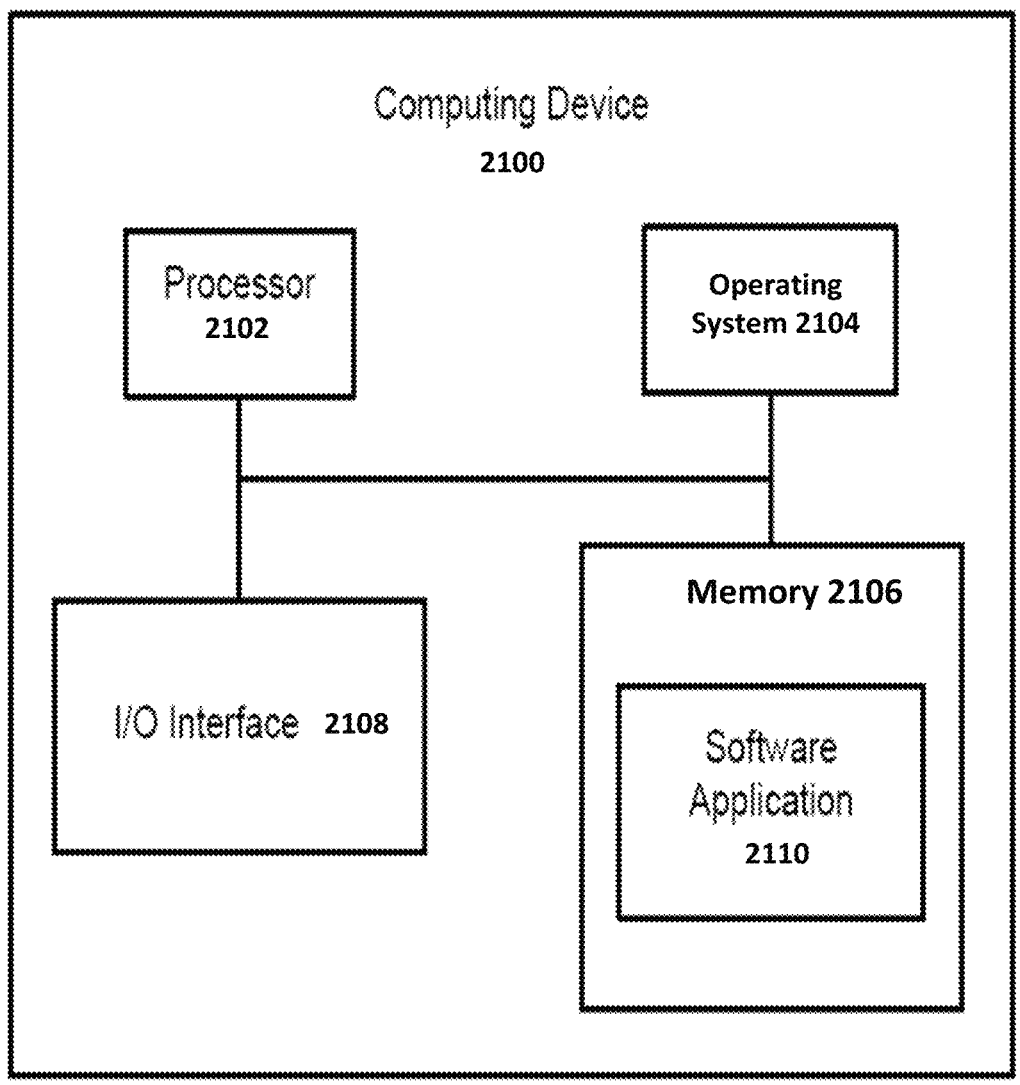
FIG. 21 is a general block diagram of a computing device usable to implement the embodiments of FIGS. 1A-19, 22-24.

FIG. 21 is a general block diagram of a computing device 2100 usable to implement the embodiments described herein. While the computing device 2100 of FIG. 21 may be described as performing one or more of the steps in the embodiments herein, in other embodiments any suitable component or combination of components of the computing device 2100 or any suitable processor or processors associated with system 2100 may facilitate performing the steps.

FIG. 21 illustrates a block diagram of an example computing system 2100, which may be used for implementations described herein. For example, computing system 2100 may be used to implement user devices 2060-2090 and/or server devices 2010, 2020 of FIG. 20 as well as to perform the method implementations described herein. In some implementations, computing system 2100 may include a processor 2102, an operating system 2104, a memory 2106, and an input/output (I/O) interface 2108. In various implementations, processor 2102 may be used to implement various functions and features described herein, as well as to perform the method implementations described herein. While processor 2102 is described as performing implementations described herein, any suitable component or combination of components of system 2100 or any suitable processor or processors associated with system 2100 or any suitable system may perform the steps described. Implementations described herein may be carried out on a user device, on a server, or a combination of both.

Computing device 2100 also includes a software application 2110, which may be stored on memory 2106 or on any other suitable storage location or computer-readable medium. Software application 2110 provides instructions that enable processor 2102 to perform the functions described herein and other functions. The components of computing system 2100 may be implemented by one or more processors or any combination of hardware devices, as well as any combination of hardware, software, firmware, etc.

For ease of illustration, FIG. 21 shows one block for each of processor 2102, operating system 2104, memory 2106, I/O interface 2108, and software application 2110. These blocks 2102, 2104, 2106, 2108, and 2110 may represent multiple processors, operating systems, memories, I/O interfaces, and software applications. In various implementations, computing system 2100 may not have all of the components shown and/or may have other elements including other types of components instead of, or in addition to, those shown herein.

Unless otherwise specified, any one or more of the embodiments described herein can be implemented using processor readable instructions which reside, for example, in tangible processor-readable storage device of a computer system or like device. The tangible processor-readable storage device can be any kind of physical memory that instructions can be stored on. Examples of the tangible processor-readable storage device include but are not limited to a disk, a compact disk (CD), a digital versatile device (DVD), read only memory (ROM), flash, and so on. As described above, certain processes and operations of various embodiments of the present invention are realized, in one embodiment, as a series of processor readable instructions (e.g., software program) that reside within tangible processor-readable storage device of a computer system and are executed by one or more processors of the computer system. When executed, the instructions cause a computer system to implement the functionality of various embodiments of the present invention. For example, the instructions can be executed by a processor, such as a central processing unit, associated with the computer system. The tangible processor-readable storage device is hardware memory and the one or more processors are hardware processors.

Various embodiments provide for a tangible processor-readable storage device including instructions executable by one or more processors for: receiving a template of a reporting workbook; receiving user specified selection of portions of the template, wherein the portions are associated with at least two dimensions of the reporting workbook; creating a modification of the template by associating a type of tag with the portions; and generating an Extensible Markup Language (XML) version of the reporting workbook based on the modification of the template.

Unless otherwise specified, one or more of the various embodiments described in the context of FIGS. 1A-20 can be implemented as hardware, such as circuitry, firmware, or processor readable instructions that are stored on one or more tangible processor-readable storage device. The processor readable instructions of the various embodiments described in the context of FIGS. 1A-20 can be executed by a one or more processors to cause a computer system to implement the functionality of various embodiments. Processor readable instructions for one or more of 910, 920, 922, 923, 1001-1011, 1030 resides on one or more tangible processor-readable storage devices and the processor readable instructions are executed by one or more processors to cause a computer system to implement the functionality of various embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A tangible processor-readable storage device including instructions executable by one or more processors for:
   receiving the template of the reporting workbook, wherein the template is in a first format type that includes cells formed by intersections of dimensions and rows and wherein at least one of the cells includes a value from the reporting workbook;
   receiving, from a user interface, user specified selection of portions of the template, wherein the portions of the template are associated with at least two dimensions of the reporting workbook;
   receiving, from the user interface, a user specified type for generating a tag;
   creating a modification of the template by automatically generating the tag in a predetermined field of each of the portions of the template based on the user specified type;
   generating a version of the reporting workbook based on the modification of the template, wherein the version is in a second format type and wherein the version includes the value from the reporting workbook;
   automatically scanning a spreadsheet of the user interface for a J shape that includes a vertical head and a horizontal handle, wherein the J shape is a dimension parent, and wherein the horizontal handle specifies a dimension, wherein text representing the dimension is depicted in the horizontal handle, and wherein at least two dimension children are under the horizontal handle and the at least two dimension children include a first dimension child and a second dimension child;
   assigning the dimension of the horizontal handle to each of cells under the vertical head without assigning the dimension of the horizontal handle to each of cells under the at least two dimension children under the horizontal handle by creating an explicit dimension map for each of the cells under the vertical head of the J shape, wherein the explicit dimension map represents the dimension;
   assigning the first dimension child to cells under the first dimension child and assigning the second dimension child to cells under the second dimension child without assigning the dimension children to the dimension parent;
   creating cell definitions for each of the cells under the vertical head, wherein each of the cell definitions include the explicit dimension map; and
   including the cell definitions in the modification of the template.

2. The tangible processor-readable storage device as recited by claim 1, wherein the predetermined field includes a comment field.

3. The tangible processor-readable storage device as recited by claim 1, wherein the automatically generating of the tag further comprises:
   including the type in the tag.

4. The tangible processor-readable storage device as recited by claim 3, wherein the type is selected from a group consisting of table begin, table end, concept, context, unit, dimension, typed dimension, and data.

5. The tangible processor-readable storage device as recited by claim 1, wherein the portions of the template include cells.

6. The tangible processor-readable storage device as recited by claim 1, wherein the receiving of the user specified selection of the portions of the template further comprises:
   receiving information indicating the portions were specified using one of painting, framing, and specifying at least a subset of the dimensions and at least a subset of the rows.

7. The tangible processor-readable storage device as recited by claim 1, wherein the receiving of the user specified type for of the tag further comprises:
   receiving user input to select a user interface control for an auto tag cell window;
   displaying the auto tag cell window in response to receiving the user input selecting the user interface control; and
   receiving the type of the tag from the auto tag cell window.

8. The tangible processor-readable storage device as recited by claim 1, wherein the second format type is selected from a group consisting of Extensible Markup Language (XML) and eXtensible Business Reporting Language (XBRL) version of the business reporting workbook.

9. The tangible processor-readable storage device as recited by claim 1, wherein the creating of the modification of the template further comprises:
   creating the modification of the template for one sheet of the reporting workbook;
   communicating the modification from a client to a server;
   receiving modifications for all of sheets of the reporting workbook; and
   generating the version at the server based on the received modifications.

10. The tangible processor-readable storage device as recited by claim 1, wherein the reporting workbook is defined by a closed taxonomy.

11. A method of autotagging a template of a reporting workbook, the method comprising:
    receiving the template of the reporting workbook, wherein the template is in a first format type that includes cells formed by intersections of dimensions and rows and wherein at least one of the cells includes a value from the reporting workbook;
    receiving, from a user interface, user specified selection of portions of the template, wherein the portions of the template are associated with at least two dimensions of the reporting workbook;
    receiving, from the user interface, a user specified type for generating a tag;
    creating a modification of the template by automatically generating the tag in a predetermined field of each of the portions of the template based on the user specified type;
    generating a version of the reporting workbook based on the modification of the template, wherein the version is in a second format type and wherein the version includes the value from the reporting workbook;
    automatically scanning a spreadsheet of the user interface for a J shape that includes a vertical head and a horizontal handle, wherein the J shape is a dimension parent, and wherein the horizontal handle specifies a dimension, wherein text representing the dimension is depicted in the horizontal handle, and wherein at least two dimension children are under the horizontal handle and the at least two dimension children include a first dimension child and a second dimension child;

assigning the dimension of the horizontal handle to each of cells under the vertical head without assigning the dimension of the horizontal handle to each of cells under the at least two dimension children under the horizontal handle by creating an explicit dimension map for each of the cells under the vertical head of the J shape, wherein the explicit dimension map represents the dimension;

assigning the first dimension child to cells under the first dimension child and assigning the second dimension child to cells under the second dimension child without assigning the dimension children to the dimension parent;

creating cell definitions for each of the cells under the vertical head, wherein each of the cell definitions include the explicit dimension map; and including the cell definitions in the modification of the template.

12. The method as recited by claim 11, wherein the predetermined field includes a comment field.

13. The method as recited by claim 11, wherein the automatically generating of the tag further comprises:

including the type in the tag.

14. The method as recited by claim 13, wherein the type is selected from a group consisting of table begin, table end, concept, context, unit, dimension, typed dimension, and data.

15. The method as recited by claim 11, wherein the portions of the template include cells.

16. The method as recited by claim 11, wherein the receiving of the user specified selection of the portions of the template further comprises:

receiving information indicating the portions were specified using one of painting, framing, and specifying at least a subset of the dimensions and at least a subset of the rows.

17. The method as recited by claim 11, wherein the second format type is selected from a group consisting of Extensible Markup Language (XML) and eXtensible Business Reporting Language (XBRL) version of the business reporting workbook.

18. The method as recited by claim 11, wherein the creating of the modification of the template further comprises:

creating the modification of the template for one sheet of the reporting workbook;

communicating the modification from a client to a server;

receiving modifications for all of sheets of the reporting workbook; and generating the version at the server based on the received modifications.

19. An apparatus comprising:

one or more processors; and a tangible processor-readable storage device including instructions for:

receiving the template of the reporting workbook, wherein the template is in a first format type that includes cells formed by intersections of dimensions and rows and wherein at least one of the cells includes a value from the reporting workbook;

receiving, from a user interface, user specified selection of portions of the template, wherein the portions of the template are associated with at least two dimensions of the reporting workbook;

receiving, from the user interface, a user specified type for generating a tag;

creating a modification of the template by automatically generating the tag in a predetermined field of each of the portions of the template based on the user specified type;

generating a version of the reporting workbook based on the modification of the template, wherein the version is in a second format type and wherein the version includes the value from the reporting workbook;

automatically scanning a spreadsheet of the user interface for a J shape that includes a vertical head and a horizontal handle, wherein the J shape is a dimension parent, and wherein the horizontal handle specifies a dimension, wherein text representing the dimension is depicted in the horizontal handle, and wherein at least two dimension children are under the horizontal handle and the at least two dimension children include a first dimension child and a second dimension child;

assigning the dimension of the horizontal handle to each of cells under the vertical head without assigning the dimension of the horizontal handle to each of cells under the at least two dimension children under the horizontal handle by creating an explicit dimension map for each of the cells under the vertical head of the J shape, wherein the explicit dimension map represents the dimension;

assigning the first dimension child to cells under the first dimension child and assigning the second dimension child to cells under the second dimension child without assigning the dimension children to the dimension parent;

creating cell definitions for each of the cells under the vertical head, wherein each of the cell definitions include the explicit dimension map; and including the cell definitions in the modification of the template.

20. The tangible processor-readable storage device as recited by claim 1, wherein the method further comprises:

providing a first column and a second column above the horizontal handle;

providing a third column above the vertical head;

assigning the first dimension child to the cells under the first dimension child without assigning the first dimension child to the dimension parent associated with the horizontal handle because the first dimension child is in the first column;

assigning the second dimension child to the cells under the second dimension child without assigning the dimension child to the dimension parent of the horizontal handle because the second dimension child is in the second column; and assigning the dimension of the horizontal handle to each of the cells under the vertical header because the vertical head is in the third column.

* * * * *

UNITED STATES PATENT AND TRADEMARK OFFICE
CERTIFICATE OF CORRECTION

| | | |
|---|---|---|
| PATENT NO. | : 11,644,949 B2 | Page 1 of 1 |
| APPLICATION NO. | : 15/462401 | |
| DATED | : May 9, 2023 | |
| INVENTOR(S) | : Acorda et al. | |

It is certified that error appears in the above-identified patent and that said Letters Patent is hereby corrected as shown below:

In the Specification

In Column 2, Line 13, delete "embodiment" and insert -- embodiment. --, therefor.

In Column 11, Line 15, delete "23. That" and insert -- 23) that --, therefor.

In Column 13, Line 22, delete "herein" and insert -- herein. --, therefor.

In Column 15, Line 4, delete "that that" and insert -- that --, therefor.

In Column 15, Line 33, delete ""6"" and insert -- "6"} --, therefor.

In Column 15, Line 34, delete ""0"" and insert -- "0"} --, therefor.

In Column 15, Line 55, delete "in in" and insert -- in --, therefor.

In Column 17, Line 34, delete "1011" and insert -- 1011. --, therefor.

Signed and Sealed this
Twentieth Day of February, 2024

Katherine Kelly Vidal
*Director of the United States Patent and Trademark Office*